US011876862B2

(12) United States Patent
Lal et al.

(10) Patent No.: US 11,876,862 B2
(45) Date of Patent: *Jan. 16, 2024

(54) ESTABLISHMENT OF PERSISTENT CONNECTION BETWEEN FILE ATTACHMENTS UPLOADED TO CLOUD STORAGE AND ASSOCIATED ELECTRONIC COMMUNICATIONS

(71) Applicant: Microsoft Technology Licensing, LLC, Redmond, WA (US)

(72) Inventors: Ankur Suresh Lal, Seattle, WA (US); Kyle Patrick Curlett, Seattle, WA (US); Man Kwan Liu, Issaquah, WA (US); Daniel Sungje Choi, Sammamish, WA (US); Fiona Lieurance Gasaway, Seattle, WA (US); Cara Leggett Silver, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/066,768

(22) Filed: Dec. 15, 2022

(65) Prior Publication Data

US 2023/0119070 A1    Apr. 20, 2023

Related U.S. Application Data

(63) Continuation of application No. 17/244,927, filed on Apr. 29, 2021, now Pat. No. 11,558,461.

(51) Int. Cl.
*H04L 67/1097* (2022.01)
*H04L 67/06* (2022.01)

(52) U.S. Cl.
CPC .......... *H04L 67/1097* (2013.01); *H04L 67/06* (2013.01)

(58) Field of Classification Search
CPC .......................... H04L 67/1097; H04L 67/06
See application file for complete search history.

(56) References Cited

U.S. PATENT DOCUMENTS

| 2010/0082713 A1* | 4/2010 | Frid-Nielsen | ........... G06F 16/14 707/821 |
| 2014/0189021 A1* | 7/2014 | Kadashevich | .......... H04L 51/08 709/206 |

(Continued)

*Primary Examiner* — Viet D Vu

(57) ABSTRACT

Examples of the present disclosure describe systems and methods for establishing a persistent connection between file attachments uploaded to cloud storage and associated electronic communications. An electronic communication including an attached file may be stored and presented in a communication application user interface that includes interactive functions, such as edit and save functions. Upon selection of an interactive function, a copy of the file may be uploaded to a cloud storage location and, in some examples, opened in a productivity application. A link to the file at the cloud storage location may be stored as a property of the file that is stored with the electronic communication. Resultantly, a connection may be maintained between the file at the cloud storage location and the electronic communication. Based on this connection, the copy of the file at the cloud storage location may be opened upon a subsequent selection of an interactive function.

20 Claims, 18 Drawing Sheets

(56) References Cited

U.S. PATENT DOCUMENTS

| | | | |
|---|---|---|---|
| 2015/0277725 A1* | 10/2015 | Masterson | G06F 3/04842 715/753 |
| 2016/0094499 A1* | 3/2016 | Uraizee | G06F 3/0482 715/752 |
| 2016/0283514 A1* | 9/2016 | Wei | H04L 51/42 |

* cited by examiner

FIG. 3D

ESTABLISHMENT OF PERSISTENT CONNECTION BETWEEN FILE ATTACHMENTS UPLOADED TO CLOUD STORAGE AND ASSOCIATED ELECTRONIC COMMUNICATIONS

CROSS-REFERENCE TO RELATED APPLICATIONS

This application is a continuation of U.S. patent application Ser. No. 17/244,927, filed Apr. 29, 2021 know U.S. Pat. No. 11,558,461), entitled "Establishment of Persistent Connection Between File Attachments Uploaded to Cloud Storage and Associated Electronic Communications," which is incorporated herein by reference in its entirety.

BACKGROUND

A large majority of files shared between users are shared as attachments to electronic communications that are sent and received using a communication service. To edit files received as attachments, the files may be downloaded and saved to a local storage location, edited, and then re-attached to reply or new communications. Each file version sent and received may also be stored at the respective user's mailbox by an electronic communication server of the communication service. This back and forth editing behavior may be repeated numerous times between each of the users associated with the file.

Additionally, despite the edited files being saved to some other storage location, users often utilize their mailbox as a default or primary storage location for these file attachments. For example, even after a user has edited and saved the file to a dedicated storage system, the user may simply return to the electronic communication that includes the attachment within their mailbox to retrieve the file. However, this file attachment is the original attachment received with the electronic communication. Therefore, if the user has previously edited and saved the file, the version of the file retrieved from the electronic communication is not a latest version.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for establishing a persistent connection between file attachments uploaded to cloud storage locations and associated electronic communications. In aspects, a user may select to view and/or interact with an electronic communication using a communication application associated with an electronic communication server of a communication service. The electronic communication may include a file as an attachment, where the electronic communication server may store the file with the electronic communication. The user may begin interacting with the file by selecting one or more functions, such as an edit function or a save function. In some examples, the edit function may be a one-click edit control element provided for display within a user interface of the communication application. Upon selection of one of the functions, a copy of the file can be automatically uploaded to a cloud storage location provided by a storage service and, in some examples, opened in either a web productivity application or a local productivity application that has associated functionality for enabling interaction with (e.g., editing of) the file. Thus, in at least some examples, one-click uploading and editing of the file is enabled. A link to the file at the cloud storage location may be stored as a property of the file (e.g., the original file received as the attachment) that is stored with the electronic communication by the communication service. Resultantly, a persistent connection may be maintained between the file at the cloud storage location and the electronic communication.

Based on the persistent connection, when the user later returns to the electronic communication and subsequently selects to edit or otherwise interact with the file, a detection may be made that a copy of the file has already been uploaded and the copy of the file is opened (e.g., rather than opening the original file received as the attachment and stored by the electronic communication server or uploading and opening a new copy of the file) in either the web productivity application or the local productivity application. Additionally, after the copy of the file is uploaded, and the user is previewing the file using the communication application, the user may be informed that an updated version of the file exists in cloud storage and may be prompted to select a control element to cause the copy of the file at the cloud storage location to be opened. Further, after the copy of the file is uploaded and the user is viewing and/or editing that copy of the file or the user is replying back to the electronic communication, the user may be prompted to share a link with an original sender and/or one or more other recipients of the electronic communication to enable efficient collaboration of the single copy of the file at the cloud storage location (e.g., the cloud hosted version of the file).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 3D illustrates a user interface of a local productivity application associated with the file type for editing the file that includes a share control element and prompt.

DETAILED DESCRIPTION

Figure 1:
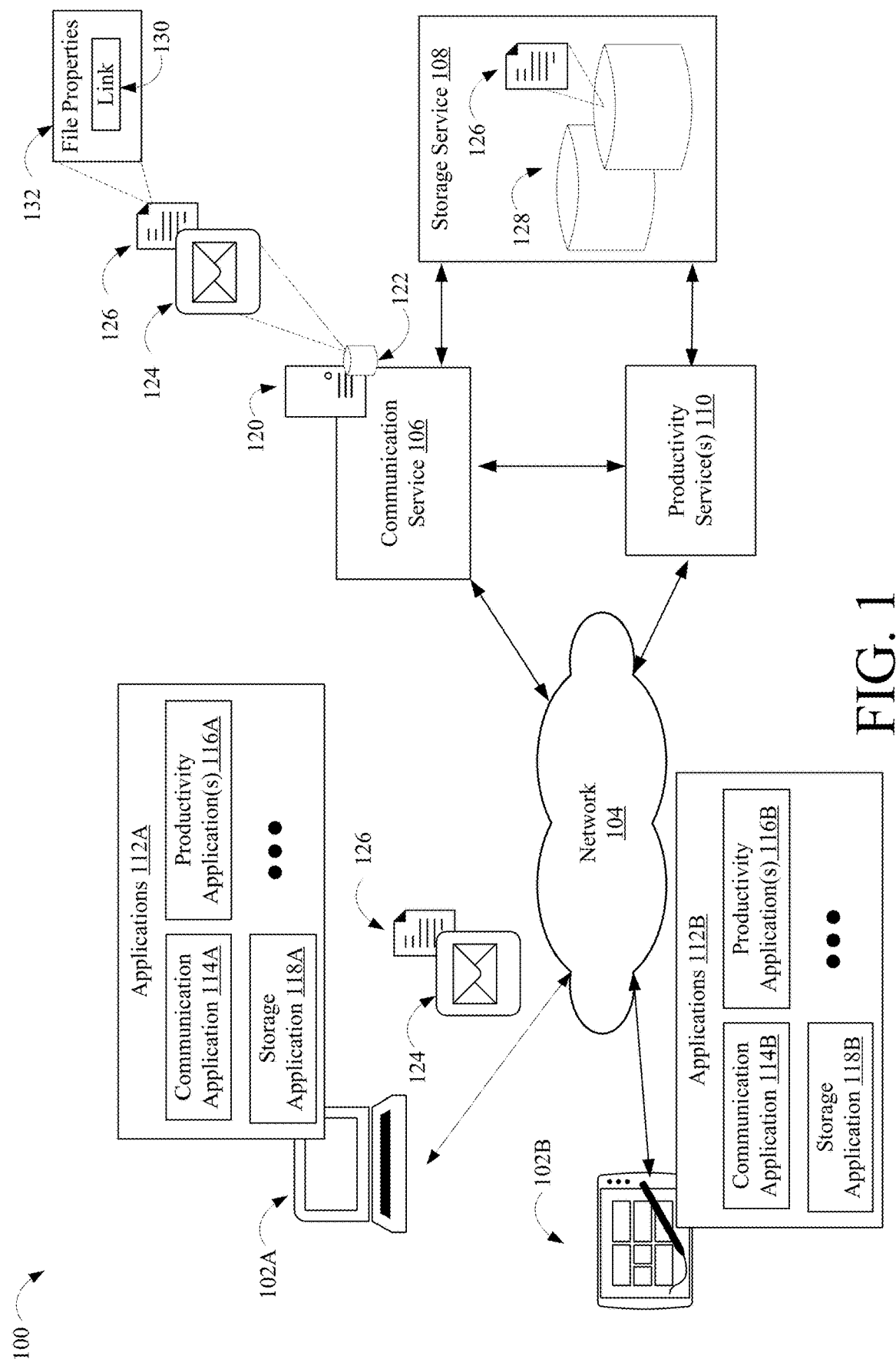
FIG. 1 illustrates an overview of an example system for establishing a persistent connection between file attachments uploaded to cloud storage and associated electronic communications to prevent creation of duplicate files.

As briefly discussed above, a large majority of files shared between users are shared as attachments to electronic communications, such as e-mails, instant messages, etc., that are sent and received using a communication service. To edit files received as attachments, the files may be downloaded and saved to a local storage location or uploaded and saved to a cloud-based storage location, edited, and then re-attached to reply or new communications. Each file version sent and received may also be stored at the respective user's mailbox by an electronic communication server of the communication service. This back and forth editing behavior may be repeated numerous times between each of the users associated with the file, which consumes a significant amount of computing and storage resources.

Further, despite the edited files being saved to a local or cloud-based storage location, users often utilize their mailbox as a default or primary storage location for these file attachments. For example, even after a user has edited and saved the file to a dedicated storage system, the user may simply return to the electronic communication that includes the attachment within their mailbox to retrieve the file. However, this file attachment is the original attachment received with the electronic communication. Therefore, if the user has previously edited and saved the file, the version of the file retrieved from the electronic communication is not the latest version. Accordingly, reliance on this type of storage severely restricts the capabilities of users to edit and collaborate on a file efficiently with others.

To reduce the amount of computing and storage resources consumed and improve the efficiency of file collaboration, the present disclosure describes systems and methods for establishing a persistent connection between file attachments uploaded to cloud storage locations and associated electronic communications. In aspects, a user can access a communication service (e.g., using a communication application) to open an electronic communication and begin editing a file received as an attachment to the electronic communication by selecting an edit function. In some examples, the edit function may be a one-click edit control element within a user interface of the communication application used to access the communication service. Upon selection of the edit function, a copy of the file can be automatically uploaded to a cloud storage location provided by a storage service associated with the communication service and opened in either a web productivity application or a local productivity application that has associated functionality for enabling editing of the file. In some examples, whether the file is opened in the web productivity application or the local productivity application may be based on the user's preference setting or the user's most recent selection for how to open a similar file type. A link to the file at the cloud storage location may be stored as a property of the file (e.g., the original file received as the attachment) that is stored with the electronic communication by the communication service. Resultantly, a persistent connection may be maintained between the file at the cloud storage location and the electronic communication. In another example, the file may be similarly uploaded to the cloud storage location and the link saved as the property of the file to cause persistent maintenance of the connection between the file at the cloud storage location and the electronic communication if another function selectable to interact with the file, such as a save function, is initially selected.

Based on the persistent connection, when the user later returns to the electronic communication and subsequently selects to edit or otherwise interact with the file, a detection may be made that a copy of the file has already been uploaded and this copy of the file is opened (e.g., rather than opening the original file received as the attachment or uploading and opening a new copy of the file) in either the web productivity application or the local productivity application to enable editing. The detection may be based on an identification of the link within the properties of the filed stored with the electronic communication by the communication service. Additionally, after the copy of the file is uploaded, and the user is previewing the file using the communication service, the user may be informed that an updated version of the file exists in cloud storage and prompted to select a control element to cause the copy of the file at the cloud storage location to be opened. Further, after the copy of the file is uploaded and the user is viewing or editing that copy of the file and/or the user is replying to the electronic communication, the user may be prompted to share a link with an original sender and/or one or more other recipients of the electronic communication to enable efficient collaboration of the single copy of the file at the cloud storage location (e.g., the cloud hosted version of the file).

Accordingly, the present disclosure provides a plurality of technical benefits including but not limited to reduced consumption of computing and storage resources by enabling (e.g., via the persistently maintained connection)

and prompting collaboration via the single copy of the file at the cloud storage location rather than relying on the conventional back and forth receiving, downloading/uploading, editing, re-attaching, and sending of new versions of the file.

Figure 10:
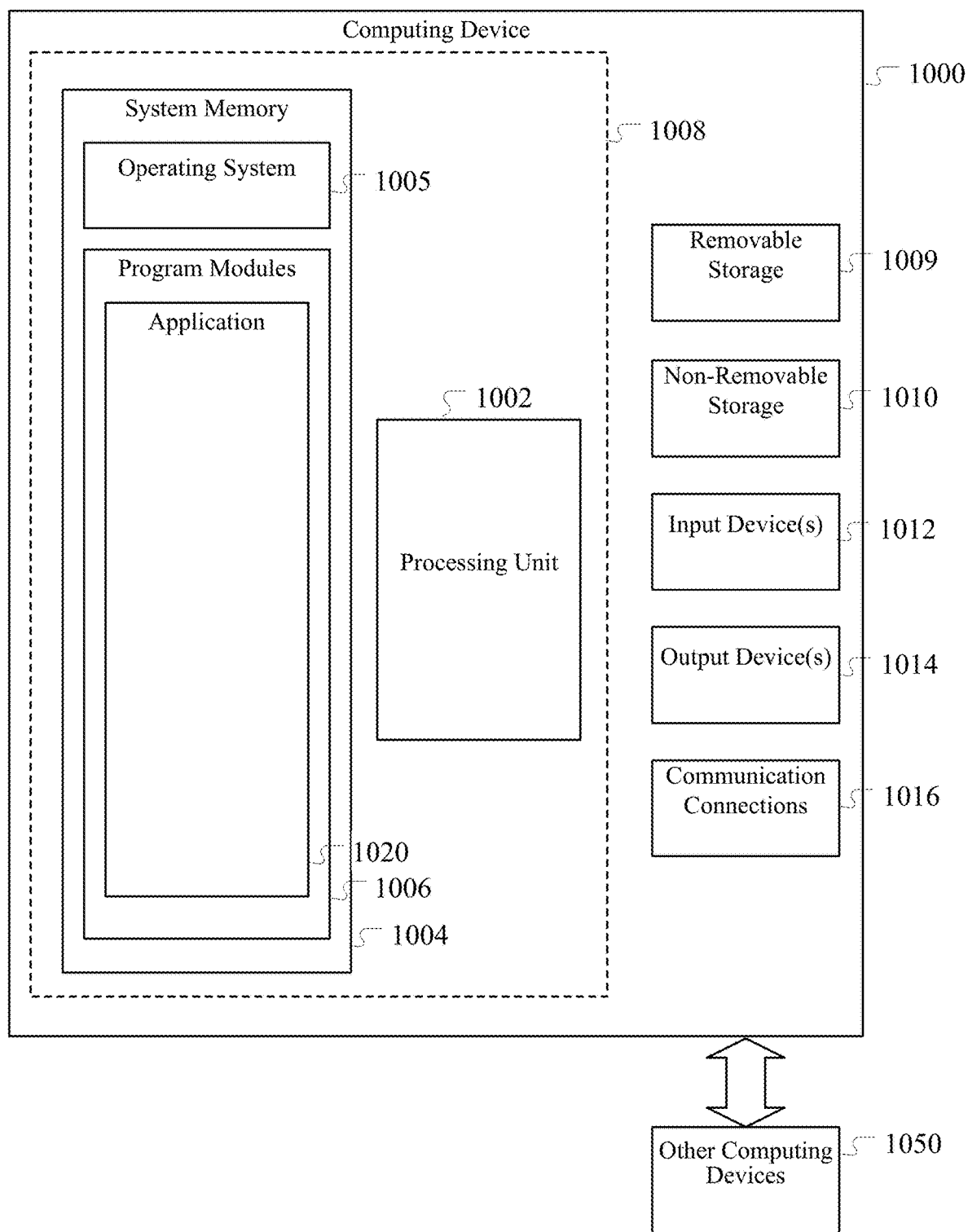
FIG. 10 is a block diagram illustrating example physical components of a computing device with which aspects of the disclosure may be practiced.
Figure 11A:
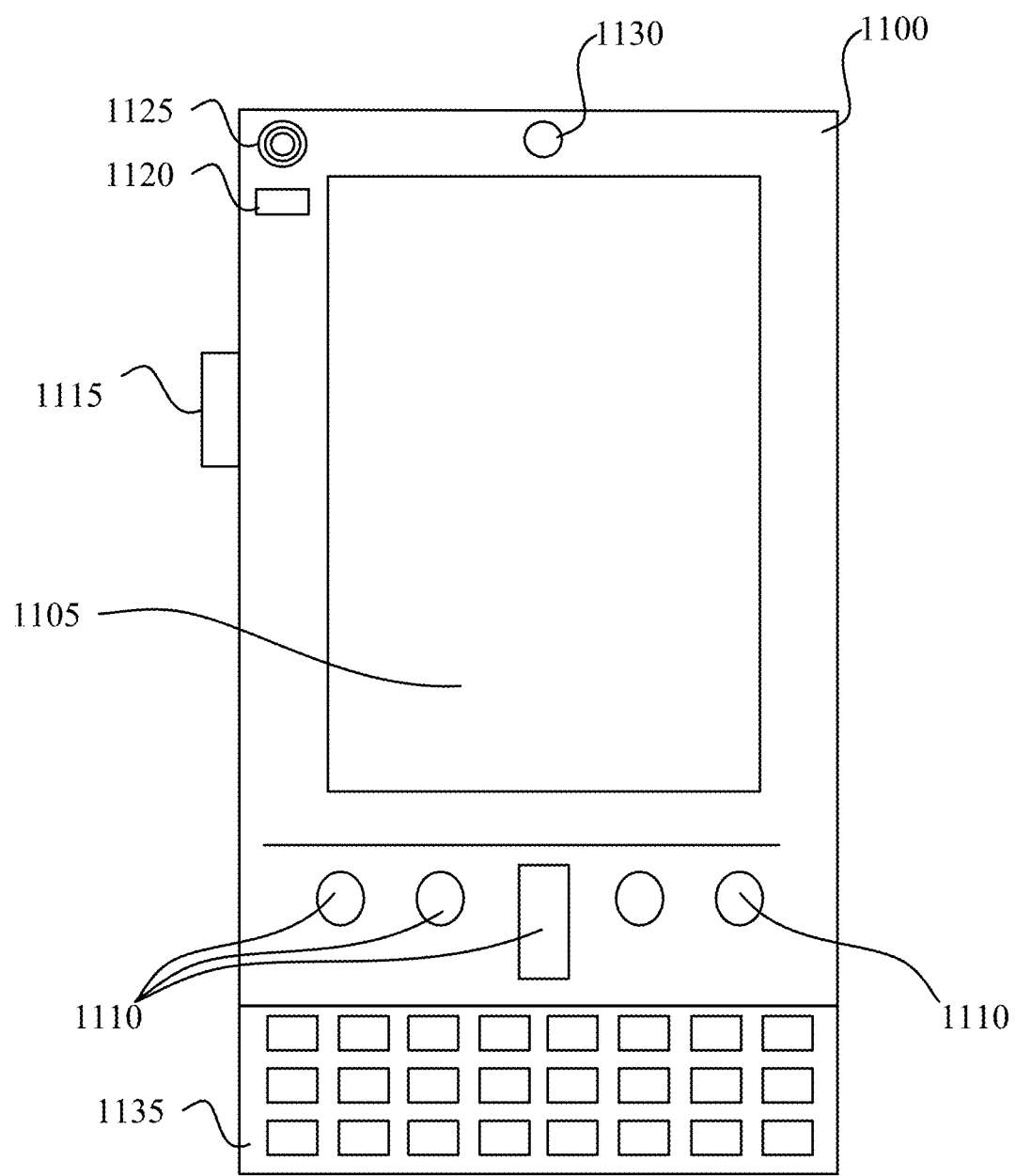
FIGS. 11A and 11B are simplified block diagrams of a mobile computing device with which aspects of the present disclosure may be practiced.
Figure 11B:
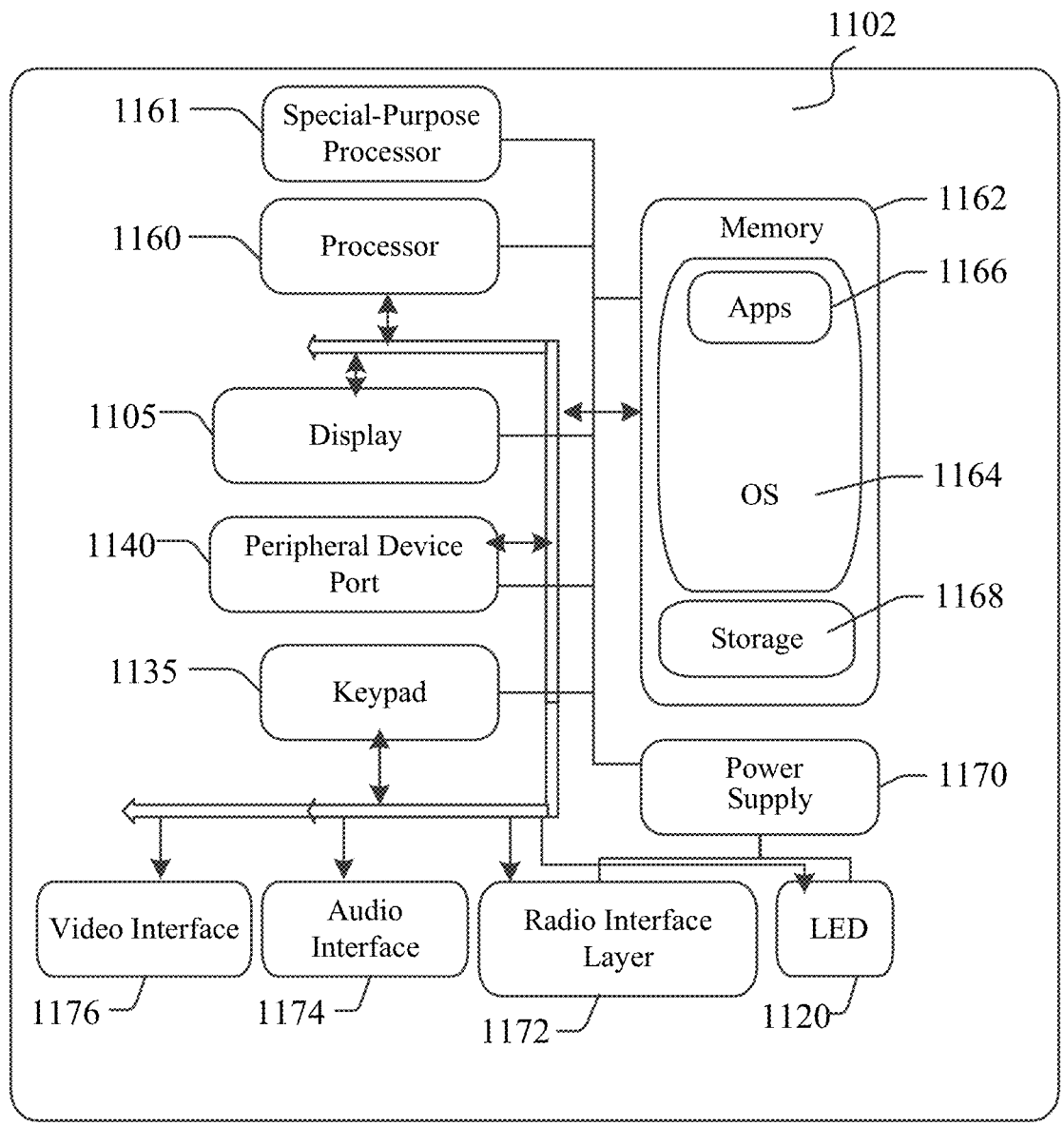

FIG. 1 illustrates an overview of an example system 100 for establishing a persistent connection between file attachments uploaded to cloud storage and associated electronic communications to prevent creation of duplicate files. Example system 100 as presented is a combination of interdependent components that interact to form an integrated whole. Components of the system 100 may be hardware components or software components implemented on and/or executed by hardware components of the system 100. In some examples, the components of the system 100 disclosed herein may be distributed across multiple devices. For instance, applications running on client computing devices may be utilized to generate electronic communications and/or files for attachment to the electronic applications by accessing other devices in a network, such as one or more remote cloud or web server devices, that process, route, and store the respective information. FIGS. 10, 11A, and 11B provide example processing devices of the system 100 such as the client devices and the remote cloud or web server devices.

In FIG. 1, system 100 comprises first computing device 102A and second computing device 102B (collectively "computing devices 102"), network 104, and a plurality of cloud services including at least a communication service 106, a storage service 108, and one or more productivity services 110 that are made available by a plurality of respective servers. In some examples, the cloud services may be associated with and capable of interacting with one another. For example, the cloud services may be provided by a same service provider or affiliated service providers to enable varying levels of integration such that actions or commands performed by one service, such as the communication service 106, may cause particular actions or commands to be performed by the storage service 108 or productivity services 110.

In some aspects, the plurality of cloud services may be hosted by one or more datacenters. The datacenters may include multiple computing devices (e.g., servers) that operate a plurality virtual machines. A virtual machine can be an isolated software container that has an operating system and an application, similar to the device described below in FIG. 10. In some examples, each of the hosted services may be a separate logical entity operated or executed independently of one another (e.g., executed by a separate virtual machine in a same or different datacenter). In other examples, one or more of these services may be operated or executed by a same virtual machine. In further examples, one or more of these services may be operated or executed by other components (e.g., by one or more servers in a distributed environment). One of skill in the art will appreciate that the scale of systems such as system 100 may vary and may include additional or fewer components than those described in FIG. 1.

Examples of the computing devices 102 include, but are not limited to, personal computers (PCs), server devices, mobile devices (e.g., smartphones, tablets, laptops, personal digital assistants (PDAs)), and wearable devices (e.g., smart watches, smart eyewear, fitness trackers, smart clothing, body-mounted devices). The computing devices 102 may be client computing devices capable of accessing the plurality of services over a network, such as network 104, through one or more applications 112A, 112B (collectively "applications" 112) executed by each of the computing devices 102 that are associated with the respective services.

The applications 112 may include communication applications 114A, 114B (collectively "communication applications" 114) to access the communication service 106 over the network 104 for sending and receiving electronic communications. The electronic communications may include electronic mail ("e-mail"), instant messages, SMS messages, and other similar electronic communications. The applications 112 may also include one or more types of productivity applications 116A, 116B (collectively "productivity applications" 116) to access the corresponding productivity services 110 over the network 104 for creating and/or editing files. Example productivity applications 116 include word processing applications, spreadsheet applications, note-taking applications, presentation applications, and image or video editing applications, among other similar applications. For purposes of this disclosure, the productivity applications 116 do not include (e.g., are different types of application from) the communication application 114 and the storage application 118. The applications 112 may further include storage applications 118A, 118B (collectively "storage applications" 118) to access the storage service 108 over the network 104 for viewing, retrieving, and sharing stored files.

In some examples, the computing devices 102 may execute a thin version of the applications 112 (e.g., a web application running via a web browser) or a thick version of the applications 112 (e.g., a locally installed application) on the computing device 102. Examples of the network 104 over which the computing devices 102 access the plurality of services include, but are not limited to, personal area networks (PANs), local area networks (LANs), metropolitan area networks (MANs), and wide area networks (WANs).

The communication service 106 may include or more servers, such as an electronic communication server 120, for allowing electronic mail and other electronic communications (e.g., instant messages, and other similar electronic communications) to be exchanged between the various users. An example of the communication service 106 may be the EXCHANGE SERVER service from Microsoft Corporation. The communication service 106 may also include one or more databases 122 associated with the electronic communication server 120 for storing the electronic communications. In some examples, storage of the electronic communications within the databases 122 may be organized based on mailboxes associated with the users of the communication service 106. An electronic communication 124, such as an e-mail, may be communicated between one or more users, such as a first user associated with the first computing device 102A and a second user associated the second computing device 102B, for passing text-based communications, and a variety of attached files, for example, audio files, text files, image files, data files, and the like. For example, the electronic communication 124 may include a file 126 as an attachment.

In some examples, the file 126 may be a file created by the first user using one or more of the productivity services 110 (e.g., via a corresponding productivity application 116A executing at the first computing device 102A). Example productivity services 110 may include word processing, spreadsheet, presentation, notes, and image and/or video editing related services, among other similar services. Thus, the file 126 may be a word processing document, a spreadsheet document, a presentation document, a notes document, an image file, a video file, a photograph, and the like. As an illustrative example, the first user associated with the first computing device 102A may utilize a word processing application of the productivity applications 116A executing on the first computing device 102A to create a word processing document. The user may then open, if not already opened, the communication application 114A on the first computing device 102A to access the communication service 106 to create the electronic communication 124, attach the word processing document as the file 126, and send the electronic communication 124 with the file 126 attached to the second user of the second computing device 102B.

The electronic communication server 120 may store the electronic communication 124 and the file 126 in the databases 122. For example, the electronic communication 124 and the file 126 may be stored in association with a mailbox of the first user associated with the first computing device 102A (e.g., in association with sent folder of the first user's mailbox), as well as a mailbox of the second user associated with the second computing device 102B (e.g., in association with an inbox folder of the second user's mailbox). Thus, two different copies of the file 126 may be stored within the databases 122.

When the second user receives the electronic communication 124 via the communication service 106, the second user may utilize the communication application 114B executing on the second computing device 102B to access the communication service 106 in order to open the electronic communication 124 as well as to preview and/or select to edit the file 126. If the second user selects to edit the file 126, a copy of the file 126 may be automatically uploaded by the communication service 106 to a cloud storage location provided by the storage service 108 and the uploaded version of the file 126 may be provided to the second user for editing by launching a productivity application 116B capable of editing the file 126 on the second computing device 102B. The storage service 108 is illustrative of a storage repository comprising one or more data storage locations 128 at which content items, such as the file 126, may be uploaded to and stored. An example of such a storage service 108 may include the ONEDRIVE storage service from Microsoft Corporation.

As part of the uploading process, the communication service 106 may receive a link 130 to the file 126 stored at the cloud storage location. The link 130 may be a Uniform Resource Locator (URL), for example, that points to a storage location of the file 126 within the data storage locations 128. In some examples, the communication service 106 may save the link 130 as a property of the file 126 (e.g., as part of the file properties 132 of the file 126) that is stored in association with the electronic communication 124 in at least the inbox folder of the second user's mailbox within the databases 122. Resultantly, a connection between the electronic communication 124 and the uploaded version of the file 126 at the cloud storage location may be persistently maintained within the second user's mailbox over time. That way, when the second user later opens the communication application 114B and returns to the same electronic communication 124 with the attached file 126 in their inbox folder, the connection may remain hours, days, weeks, months, and years later based on a detection of the link 130 within the file properties 132. In another example, the file 126 may be similarly uploaded to the cloud storage location and the link saved as the property of the file 126 to cause persistent maintenance of the connection between the electronic communication 124 and the uploaded version of the file 126 at the cloud storage location within the second user's mailbox over time if another function selectable to interact with the file 126, such as a save function, is initially selected.

Figure 7:
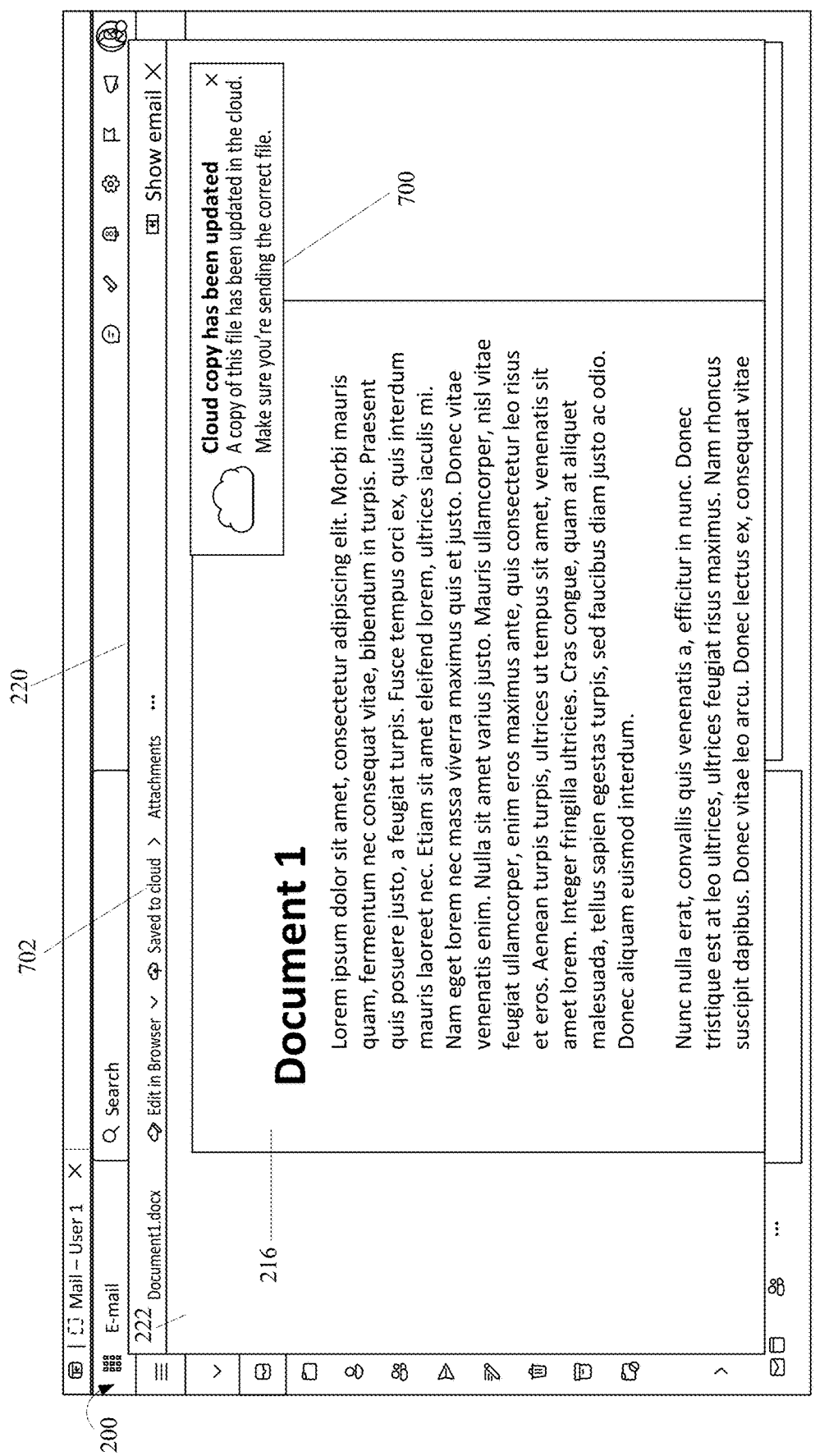
FIG. 7 illustrates a preview pane for a file attached to an electronic communication displayed when the file has been previously uploaded and edited.

In some examples, because a traditional function of the communication service 106 may be to preserve the electronic communication 124 and the attached file 126 in the original form/version received, when the second user returns to the same electronic communication 124 after the file 126 has been uploaded and/or edited, the original electronic communication 124 and the attached file 126 may remain in a format they were received. That is, the version of the electronic communication 124 and the file 126 stored in the second user's inbox within the databases 122 associated with the electronic communication server 120 may be retrieved and provided for display. However, based on the persistently maintained connection, if the second user again selects to edit the file 126, the link 130 may be used to retrieve the uploaded and edited copy of the file from the data storage locations 128 of the storage service 108 to provide to the second user for editing. Additionally, if the second user is previewing the file 126, the second user can be prompted that there have been edits been made to a copy of this file that is stored at a cloud-based location and an option to open that copy as shown in FIG. 7 below. In other examples, when the user returns and selects to preview the file 126, the uploaded and edited version of the file 126 may be provided for display along with an indication that it is a modified version and an option to open an original version of the file 126 received as the attachment to the electronic communication 124. In further examples, both the original version of the file 126 and the uploaded and edited version of the file 126 may be provided for display in a toggle-based user interface to allow the second user to toggle between to see the changes between the versions. For example, the original version of the file 126 may be provided for display in a first view and the uploaded version of the file 126 in a second view. The user may then toggle between the first and second views.

Figure 2A:
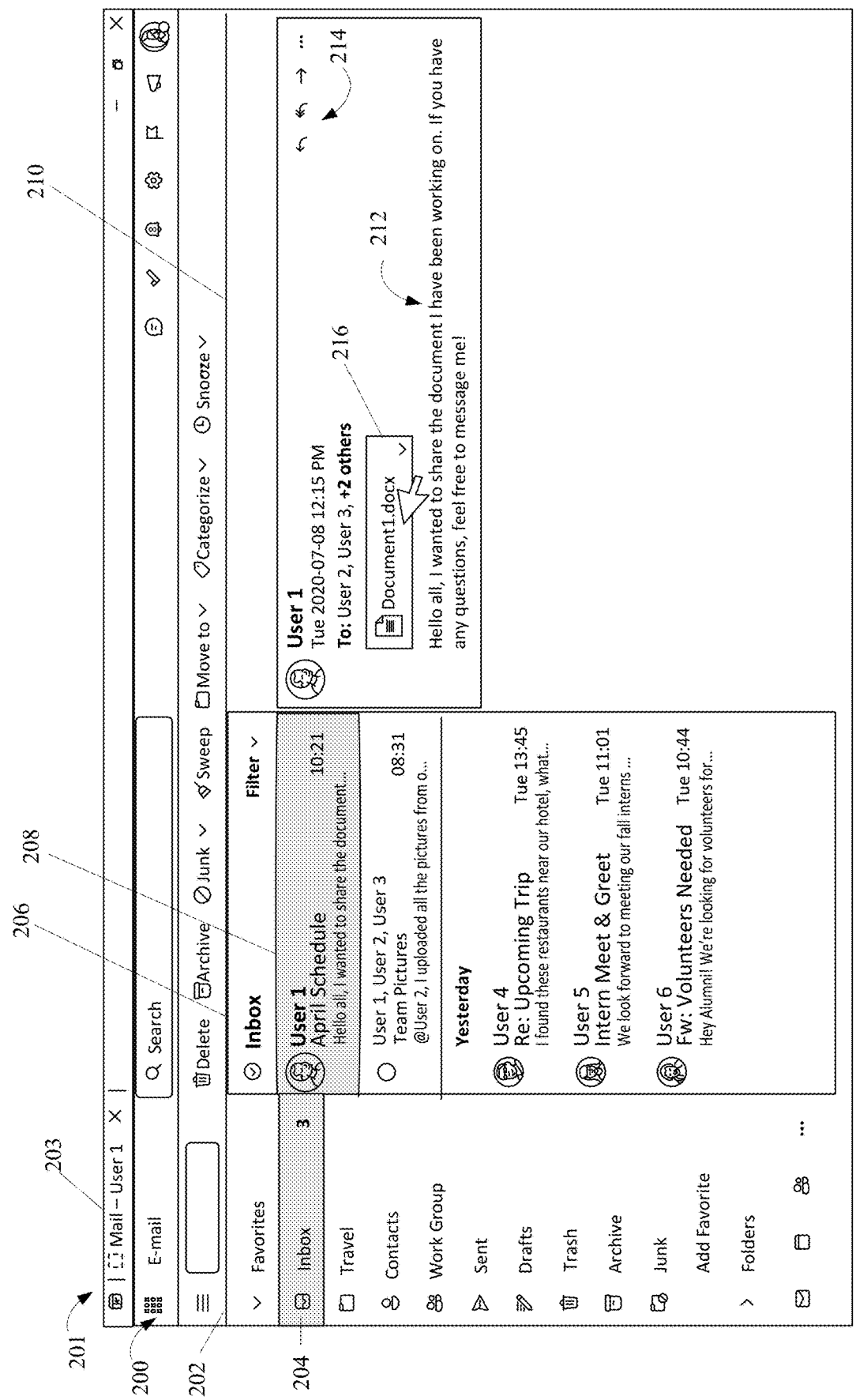
FIG. 2A illustrates one example of a user interface of an electronic communication application displaying an electronic communication with a file attached.
Figure 2B:
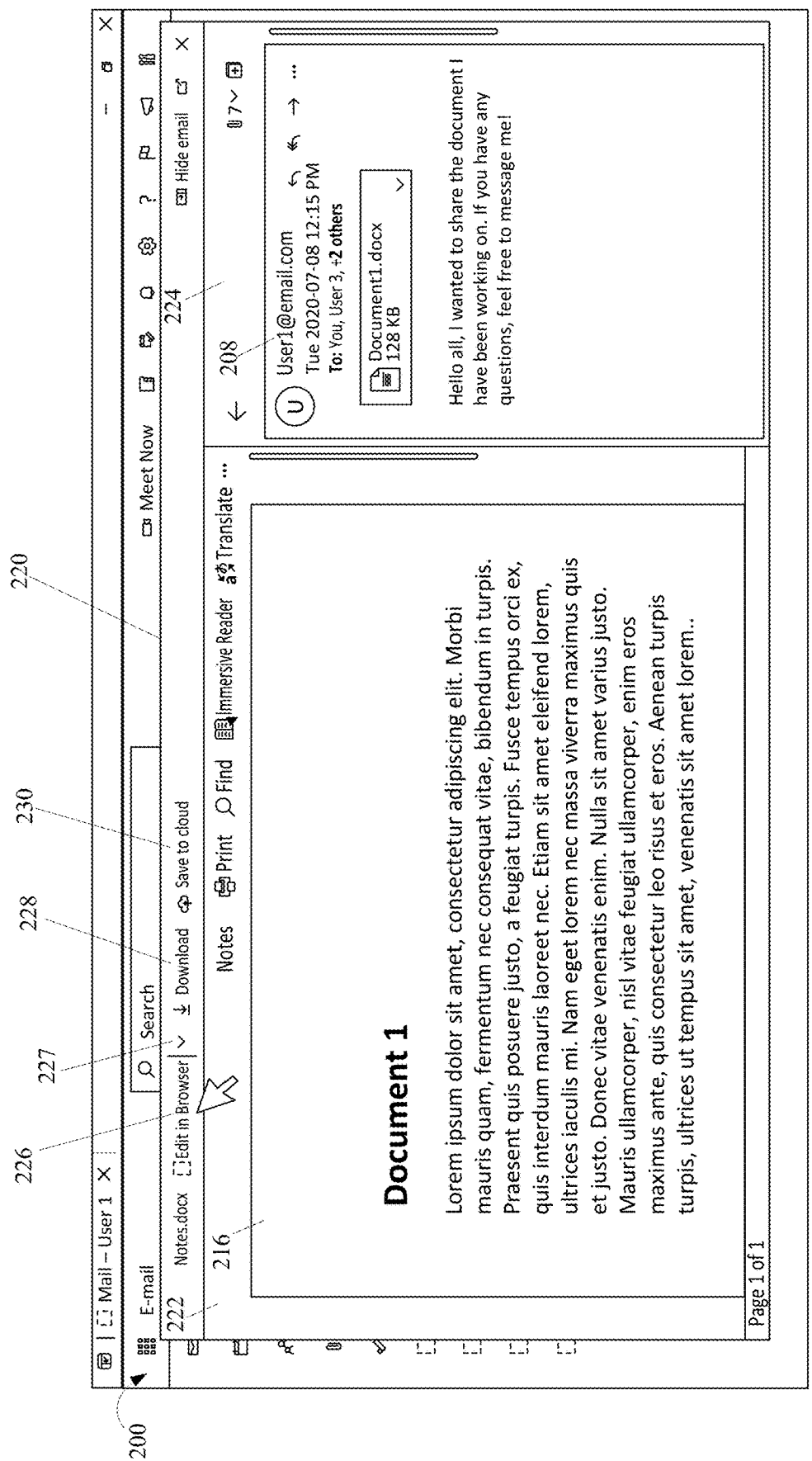
FIG. 2B illustrates a preview pane for the file attached to the electronic communication that includes a one-click edit control element.
Figure 2C:
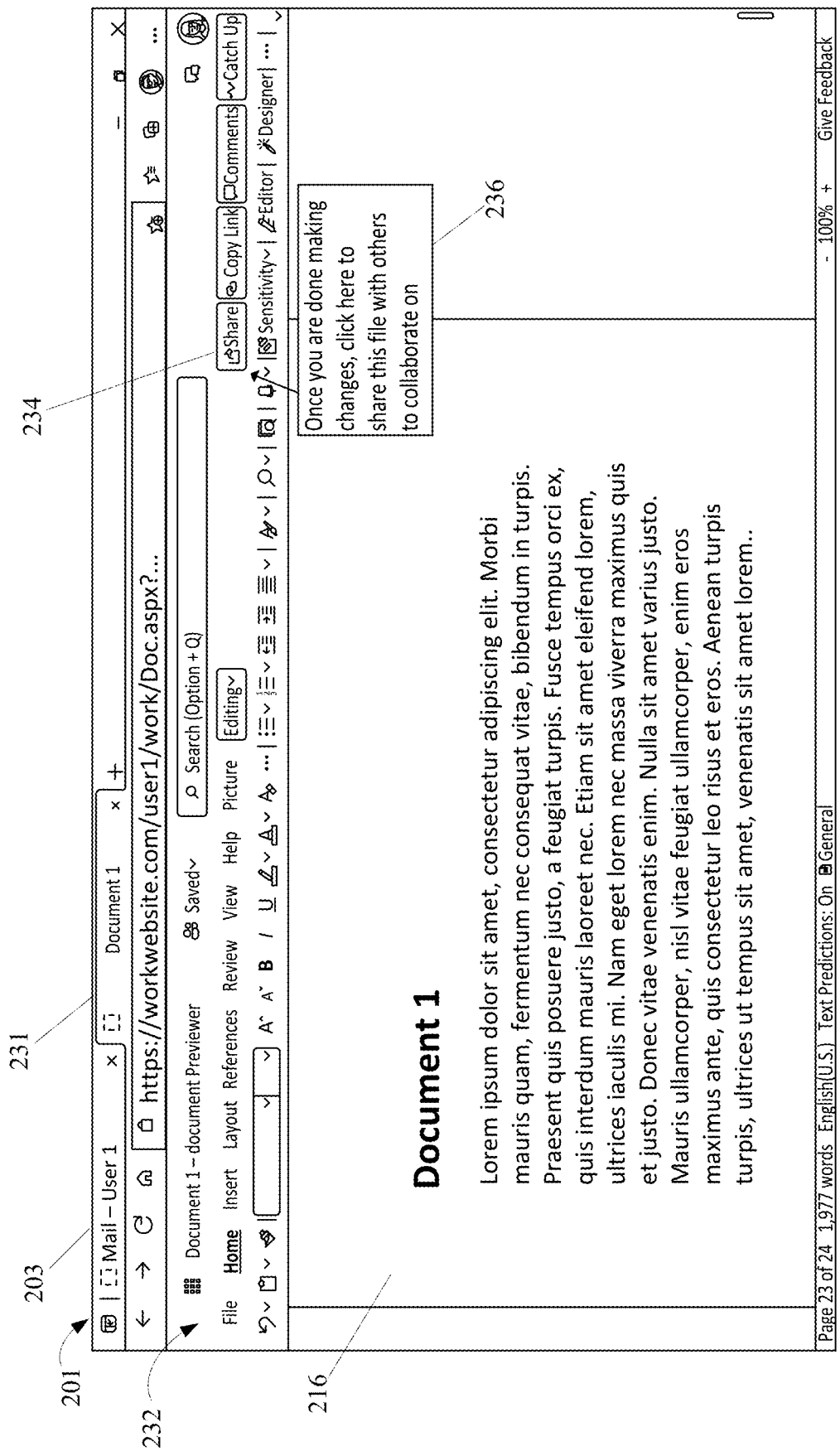
FIG. 2C illustrates a user interface of a web productivity application associated with the file type for editing the file that includes a share control element and prompt.
Figure 6A:
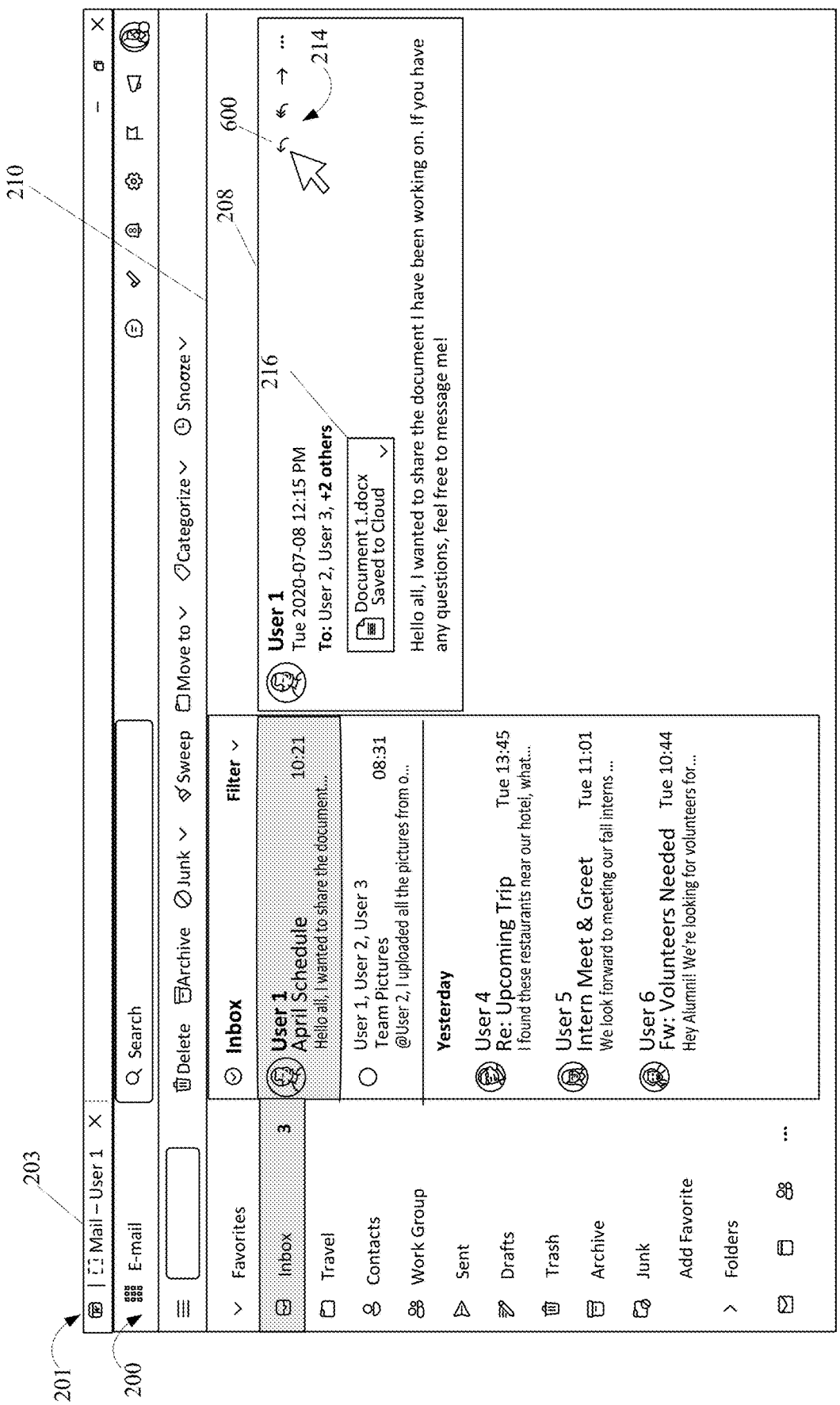
FIG. 6A illustrates another example user interface of an electronic communication application displaying an electronic communication with a file attached that includes a reply control element.
Figure 6B:
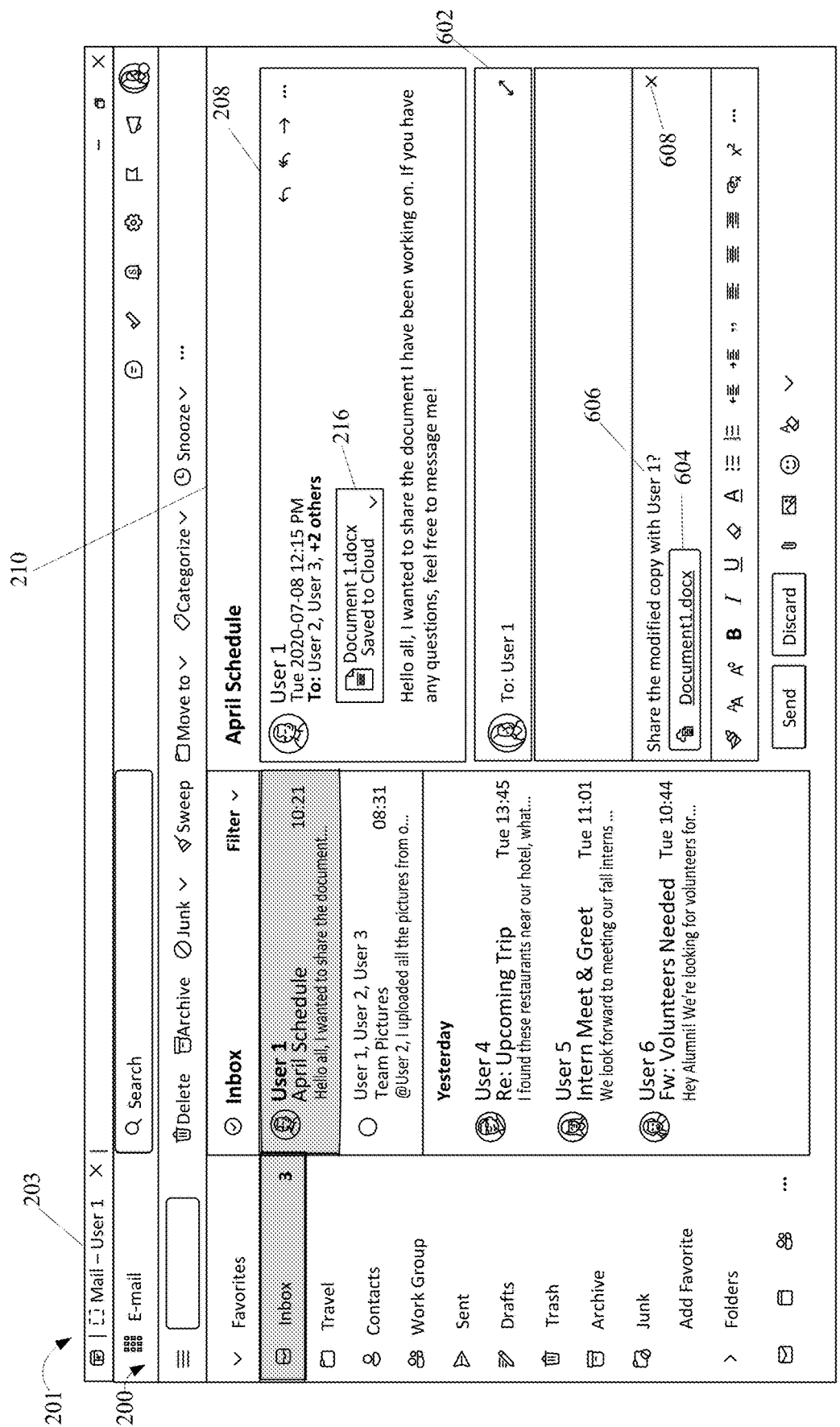
FIG. 6B illustrates a link to a file and a prompt displayed in the user interface of the electronic communication application in response to a selection of the reply control element shown in FIG. 6A and a determination that the file has been uploaded and edited.

Additionally, after the file 126 is uploaded to the cloud storage location and is being edited by the second user, the second user may be prompted to share the link 130 to the file with other users, such as the first user who initially sent the file 126 to the second user to encourage collaboration using the single copy of the file 126 at the cloud storage location as shown in FIGS. 2C and 3D below. Further, a similar prompt to share the link 130 may be provided along with the link 130 within a reply communication generated in response to the second user selecting to reply to the electronic communication 124 as shown in FIGS. 6A and 6B below.

Collaboration using the single copy of the file 126 at the cloud storage location as an alternative to the iterative process of receiving, downloading/uploading, saving, editing, re-attaching and sending file versions via electronic communications back and forth conserves a significant amount of processing and storage (e.g., memory) resources.

To illustrate a comparative example of how resources are conserved, a conventional technique can be considered for comparison. In the conventional technique, the first user may attach an original version of the file 126 as an attachment to the electronic communication 124 that is sent to the second user. A first copy of the original version of the file 126 is stored within the databases 122 in association with a sent folder of the first user's mailbox and a second copy of the original version of the file 126 is stored within the databases 122 in association with an inbox (e.g., receipt folder) of the second user. The second user may open and make edits to the original version of the file 126. The second user may then send an edited version of the file 126 as an attachment within a reply electronic communication to the first user. As a result, a first copy of the edited version of the file 126 is stored within the databases 122 in association with an inbox (e.g., receipt folder) of the second user and a second copy of the edited version of the file 126 is stored within the databases 122 in association with a sent folder of the first user's mailbox. Accordingly, at least four copies associated with two different versions this file 126 are now stored within the databases 122, in addition to storage of each of these copies in local or remote storage locations where the first and second user saved each version while creating and/or editing the file. The number of copies may increase as further edits are made between the first and second users. Additionally, as the number of users collaborating on the file 126 increase, this number of copies may be multiplied. Each of these copies takes up valuable memory within the databases 122 and other local or remote storage locations, in addition to creating confusion among users as to which version is a latest, most up-to-date version of the file 126.

In contrast, using the automatic upload and edit functionality of the present technology to establish and maintain a connection between the file 126 uploaded to the cloud storage location and the associated electronic communication 124 as described herein, the first user may attach an original version of the file 126 as an attachment to the electronic communication 124 that is sent to the second user. A first copy of the original version of the file 126 is stored within the databases 122 in association with a sent folder of the first user's mailbox and a second copy of the original version of the file 126 is stored within the databases 122 in association with an inbox (e.g., receipt folder) of the second user. The second user may select to make edits to the original version of the file 126 causing the file to be automatically uploaded to a cloud storage location within the data storage locations 128, where the uploaded file 126 is made accessible to the first user by the second user sharing a link to the file at the cloud storage location. Once the link is shared, no further versions and copies thereof need to be stored within the databases 122 or other local or remote storage locations as all users now have access and capability to edit and collaborate via the single copy of the file 126 at the cloud storage location.

Figure 8:
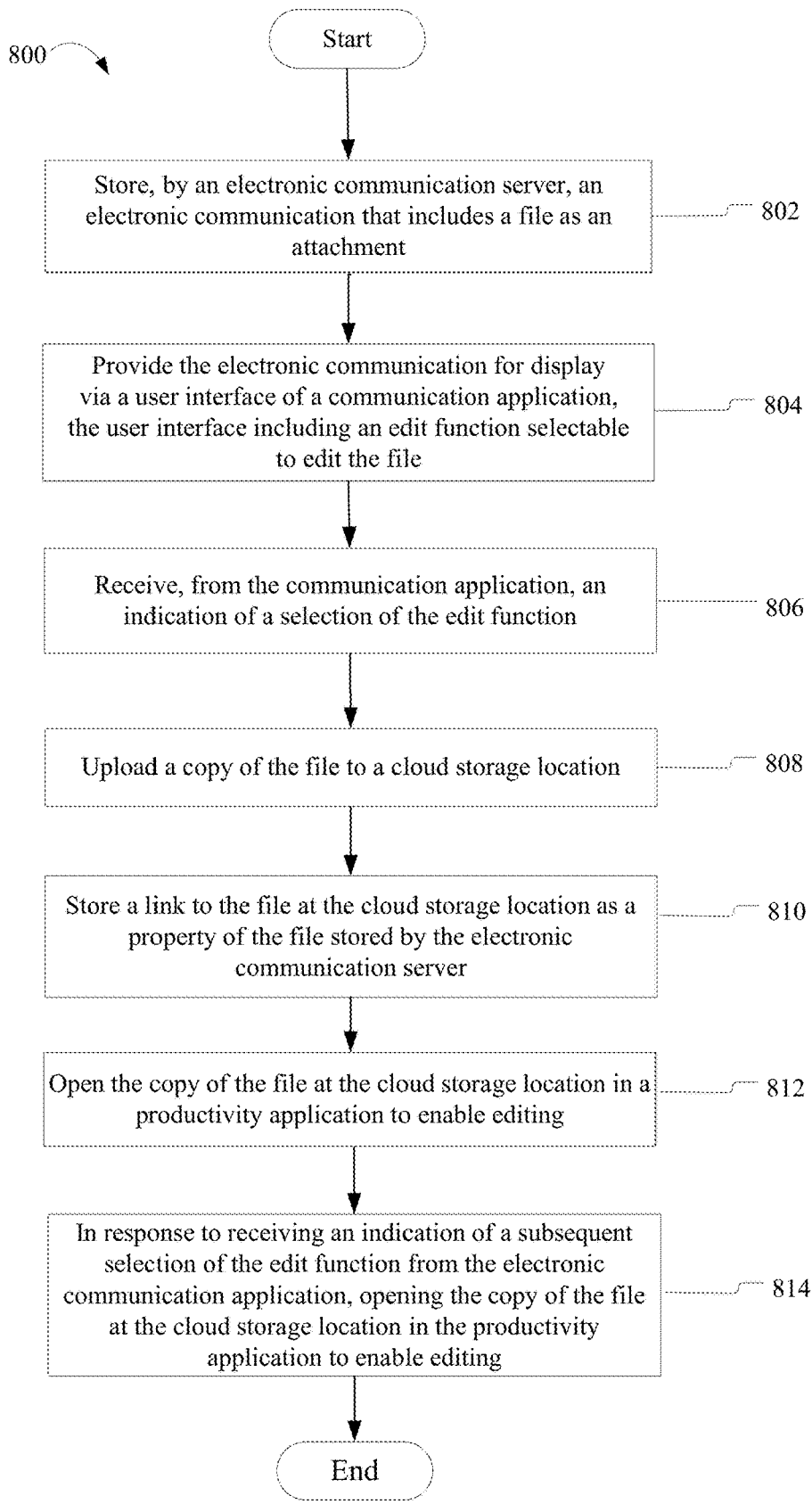
FIG. 8 illustrates an example method for establishing a persistent connection between file attachments uploaded to cloud storage and associated electronic communications to prevent creation of duplicate files.
Figure 9:
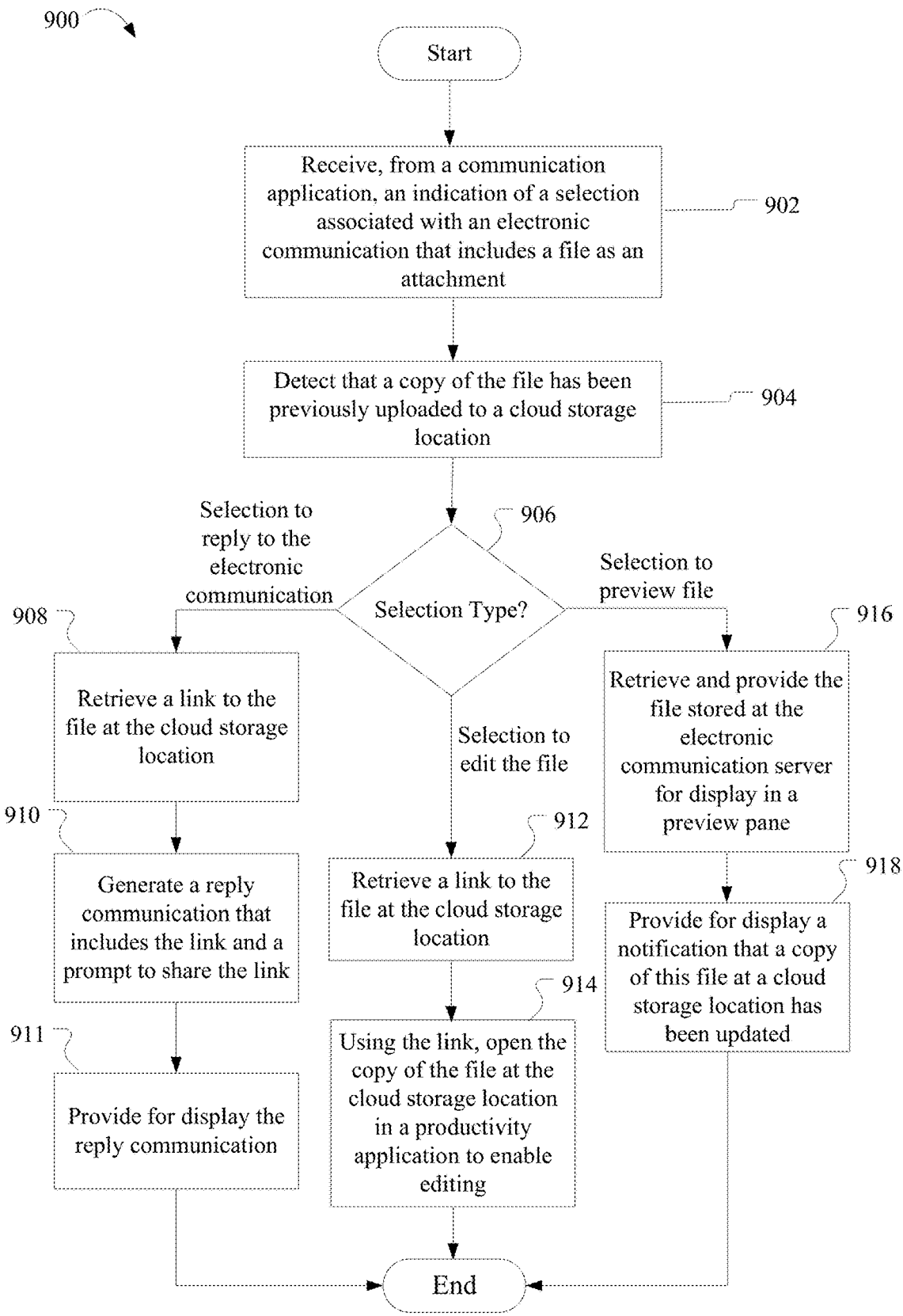
FIG. 9 illustrates an example method for detecting a presence of an uploaded copy of a file attached to an electronic communication and preventing duplication of the file.

Having described an example system that may be employed by the aspects disclosed herein, this disclosure will now describe various user interface flows in FIGS. 2A through 7 and methods in FIGS. 8 and 9 that may be performed by various aspects of the disclosure. In aspects, methods 800 and 900 of FIGS. 8 and 9 may be performed by a system comprised of one or more components of a distributed network such as system 100 of FIG. 1. However, methods 800 and 900 are not limited to such examples.

FIGS. 2A-2C illustrate one example user interface flow for previewing and editing a file attached to an electronic communication. For example, FIG. 2A illustrates a user interface 200 of the communication application 114 via which a user accesses the communication service 106 to send and receive electronic communications. In some examples, the communication application 114 may be a web application accessed via a web browser 201 operating on the computing device 102. For example, the communication application 114 may be launched in a tab 203 of the web browser 201 as illustrated. In other examples, the communication application 114 may be a locally installed application operating on the computing device 102.

When the communication application 114 is launched or opened, the user interface 200 may display a plurality of panes, including a folder pane 202 in which a variety of folders, contact items, group items, calendar items, and the like, may be provided to allow a user to select various folders, contacts, or other items associated with the communication application functionality. In this example, an inbox folder 204 may be selected from the folder pane 202.

When a folder is selected within the folder pane 202, a corresponding electronic communications pane 206 is displayed that includes a listing of individual electronic communications or an electronic communication conversation thread associated with the selected folder. As an illustrative example, when the inbox folder 204 is selected from the folder pane 202, the electronic communications pane 206 displays a plurality of electronic communications received by the user including electronic communication 208. The electronic communications displayed within the electronic communications pane 206 may be selectively viewed, interacted with, and/or responded to according to the functionality of the communication application 114. As one example, a user may select the electronic communication 208 from the electronic communications pane 206. This selection causes the electronic communication 208 to be displayed in an electronic communication viewing pane 210, which enables the user to read a message body 212 of the electronic communication 208 or otherwise interact with the electronic communication 208 using a variety of interactive control elements 214, such as by replying to the message, replying all to the message, forwarding the message, and the like. If the selected electronic communication contains a thread of more than one electronic communications comprising a communication conversation, then the entire thread may be displayed in the electronic communication viewing pane 210 to allow the user to navigate through the various electronic communications in the thread.

In some examples, the electronic communications may include one or more files as attachments. For example, the selected electronic communication 208 may include a file 216 as an attachment. In some examples, the file 216 may be displayed within an attachment well of the electronic communication 208. The file 216 may be of a file type that is capable of being created and/or edited by a particular application, such as one of the productivity applications 116. For example, the file 216 may be a word processing document that is capable of being created and/or edited by a word processing application. In other examples, the file may be a spreadsheet document, a presentation document, a notes document, an image file, a video file, a photograph, and the like capable of being created by a spreadsheet application, a presentation application, a note-taking application, and image viewing and/or editing applications, respectively.

The file 216 attached to the electronic communication 208 (e.g., the original attachment file) may be stored with the electronic communication 208 in association with the inbox folder 204 of the user's mailbox within the databases 122 by the electronic communication server 120. The file 216 may also be stored with the electronic communication 208 in association with a sent folder of the sender's mailbox within the databases 122 and/or inbox folders of any other recipients' mailboxes within the databases 122 by the electronic communication server 120.

In response to a selection of the file 216 as shown in FIG. 2A, a preview pane 220 may then be displayed as shown in FIG. 2B. In some examples, the preview pane 220 may at least partially overlay the user interface 200 as illustrated. Referring now to FIG. 2B, the preview pane 220 may include a file previewer 222 that displays the selected file 216. In some examples, the preview pane 220 may also include a communication previewer 224 that displays the electronic communication 208 to which the file 216 is attached. If the selected file belongs to a thread of electronic communications, the thread may be displayed in the communication previewer 224. The communication previewer 224 may be displayed simultaneously with and adjacent to the file previewer 222. For example, the communication previewer 224 and the file previewer 222 may be displayed as side-by-side or top-bottom previewers within the preview pane 220, among other examples. Additionally, in some examples, the communication previewer 224 may be hidden from the preview pane 220 or otherwise collapsed such that only the file previewer 222 is displayed. An example of the preview pane 220 when the communication previewer 224 is hidden or otherwise collapsed is shown in FIG. 7 below.

The preview pane 220 further includes a plurality of control elements that are selectable to trigger various functions for interacting with the file 216, including an edit control element 226, a download control element 228, and a save control element 230. The edit control element 226 may be selectable to enable the file 216 to be edited in one of the productivity applications 116 having associated functionality for editing the file 216. As discussed in more detail below, selection of the edit control element 226 may also cause automatic upload of the file 216 to a cloud storage location (e.g., within one of the data storage locations 128 provided by the storage service 108). The download control element 228 may be selectable to enable the file 216 to be downloaded and saved to local storage on the computing device 102. The save control element 230 selectable to enable the file 216 to be uploaded and saved to cloud storage (e.g., within one of the data storage locations 128 provided by the storage service 108).

In some examples, the edit control element 226 may be a default option for editing the file 216. For example, the default option ("Edit in Browser") may be to edit the file 216 in a web browser using a thin version of the productivity application 116, also referred to herein as a web productivity application, having associated functionality for editing the file 216. In other examples, the edit control element 226 displayed may represent a user preference or a most recent selection for editing chosen by the user. In further examples, one or more additional edit control elements may be accessible via the preview pane 220 as indicated by the user interface element 227. For example, upon selection of the user interface element 227 one or more additional edit control elements may be displayed in a pull-down or other similar menu as illustrated and discussed in more detail below with reference to FIG. 3B.

In response to a selection of the edit control element 226, the file 216 may be automatically uploaded to a cloud storage location provided by the storage service 108. A link that points to the cloud storage location of the file 216 may be saved as a property of the file 216 that is stored with the electronic communication 208 in association with the user's inbox folder 204 within the databases 122 by the electronic communication server 120 of the communication service 106. Resultantly, a connection between the electronic communication 208 and the uploaded version of the file 216 at the cloud storage location may be persistently maintained by the communication service 106. The file 216 would be similarly uploaded to the cloud storage location and the link saved as the property of the file 216 to cause persistent maintenance of the connection between the electronic communication 208 and the uploaded version of the file 216 at the cloud storage location had another one of the control elements, such as the save control element 230 that triggers a save function, been initially selected.

In some aspects, when the file 216 is automatically uploaded, a notification or other similar visual indication may be provided for display to one or more other users associated with the electronic communication 208 (e.g., a sender and/or one or more other recipients of the electronic communication 208) within their respective communication applications 114. This notification or other similar visual indication enables the other users to be aware that a copy of the file 216 exists at a cloud storage location, which may be used for efficient collaboration if a link to that file's cloud storage location is shared. In one example, the notification may be displayed when the electronic communication 208 via which the original file 216 was sent as an attachment is selected by one of the other users at their respective communication application 114. The notification may indicate that a particular user has created a cloud hosted version of this file and prompt the other user to send a request to the particular user to share the link to the cloud hosted version of this file. In another example, an icon may be visually displayed in conjunction with the electronic communication 208 at the respective communication applications 114 to indicate that a copy of the file 216 exists at a cloud storage location along with a prompt to request that the link be shared. In some examples, a consent of the user who is editing the file (e.g., and thus caused the automatic upload) may be required before a notification or other similar visual indication is provided.

In addition to automatically uploading the file 216 when the edit control element 226 that enables editing of the file 216 in a web browser is selected, the web productivity application (e.g., a thin version of one of productivity applications 116) having associated functionalities for editing the file 216 may be launched. For example, the web productivity application may be launched in a new tab 231 of the web browser 201 (e.g., in a different tab than the tab 203 the communication application 114 is launched in), as shown in FIG. 2C. Therefore, one-click file attachment upload and edit is enabled through the edit control element 226. Once the file 216 is automatically uploaded, the save control element 320 of the preview pane 220 may be altered from a selectable control element to an indication that the file 216 has already been saved to a cloud storage location. An example of this indication is shown in FIG. 7 below.

Referring now to FIG. 2C, upon launching the web productivity application in the new tab 231 responsive to the selection of the edit control element 226, a user interface 232 of the web productivity application may display the copy of the file 216 saved to the cloud storage location. The user may utilize functionalities of the web productivity application to edit the file 216, where any edits to the file 216 are saved to copy of the file 216 at the cloud storage location.

In some examples, the user interface 232 may also include a share control element 234 that is selectable to enable a link to the copy of the file 216 at the cloud storage location to be shared with one or more other users. In one aspect, based on the persistently maintained connection between the file 216 at the cloud storage location and the electronic communication 208, when the share control element is 236 is selected, a share feature is presented in a pull-down menu or a separate pop-up menu that includes a selectable first option to send the link to the file 216 in a reply communication to the electronic communication 208 (e.g., a first option to "Reply back to Sender of this file"). If this first option is selected, the link to the file 216 at the cloud storage location may be automatically included within a reply communication generated and sent by the communication service 106 (e.g., via the communication application 114). Additionally or alternatively, the share control element 234 may include a selectable second option to send the link to the file 216 in a new electronic communication, where the user is prompted to enter user names or e-mail addresses of recipients that the link is to be sent via the communication service 106. Additionally or alternatively, the share control element 234 may include a selectable third option to copy a link to the file 216 at the cloud storage location. For example, the link can be copied and then pasted by the user into a reply or new electronic communication. The share control element 234 may also enable the user to set permissions with respect to the file 216 that is being shared.

The user interface 232 may also display a prompt 236 associated with the share control element 234. In some examples, the prompt 236 may be displayed in the user interface 232 immediately upon the launch of the web productivity application in the new tab 231. In other examples, the prompt 236 may be displayed in response to detecting an edit has been made to the file 216 using the functionalities of the web productivity application. In further examples, the prompt 236 may be displayed after a predefined period of time has elapsed from the launching of the application in the new tab 231. The prompt 236 may point or otherwise direct the user's attention to the share control element 234 to encourage the user to share the link to the file 216 at the cloud storage location with others. The prompt 236 may also include instructive text such as "Once you are done making changes, click here to share this file with others to collaborate on," as illustrated. In some examples, the prompt 236 may be displayed upon a first selection of the edit control element 226 or a predefined number of times in addition to the first selection (e.g., to serve as a teaching moment). Additionally, the prompt 236 may be displayed if a particular time period has elapsed since the user's last selection of the edit control element 226 (e.g., to serve as a memory refresher). In other examples, the prompt 236 may be displayed regardless of number or frequency of selection of the edit control element 226.

Once the link to the file 216 at the cloud storage location has been shared with one or more other users, each of those users may collaborate on this single copy of the file 216 at the cloud storage location rather than relying on the conventional back and forth receiving, downloading/uploading, editing, re-attaching and sending of different versions of the file. For example, once the other users receive the link to the file 216 and/or select the received link to the file 216, the link may be stored as a property of the original version of the file attached to the electronic communication 208 that is stored with the electronic communication 208 within the databases 122 by the electronic communication server 120 in association with the respective users' mailboxes to establish a connection between the file 216 uploaded to the cloud storage location and the electronic communication 208 that is persistently maintained.

Figure 3A:
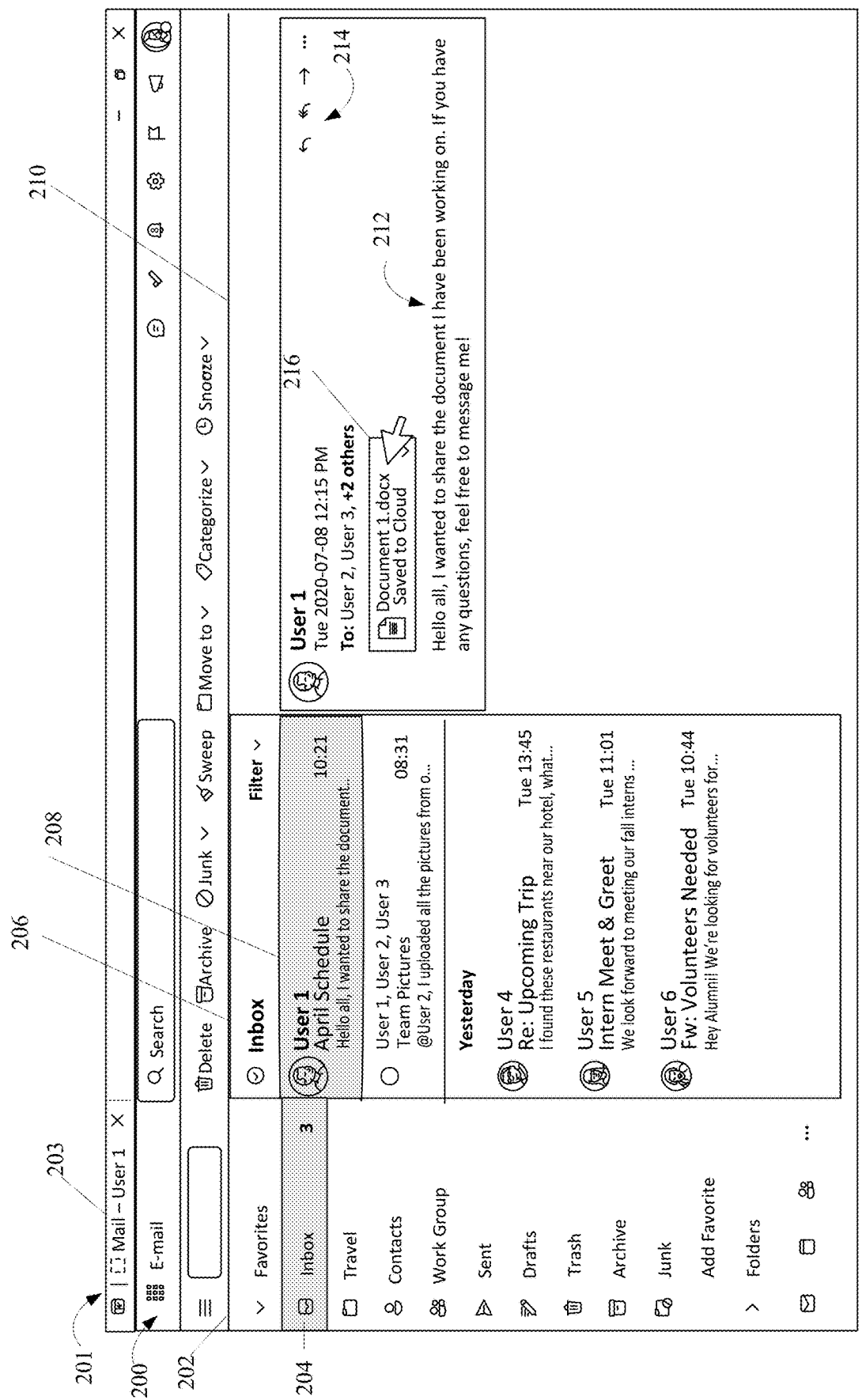
FIG. 3A illustrates another example user interface of an electronic communication application displaying an electronic communication with a file attached.
Figure 3B:
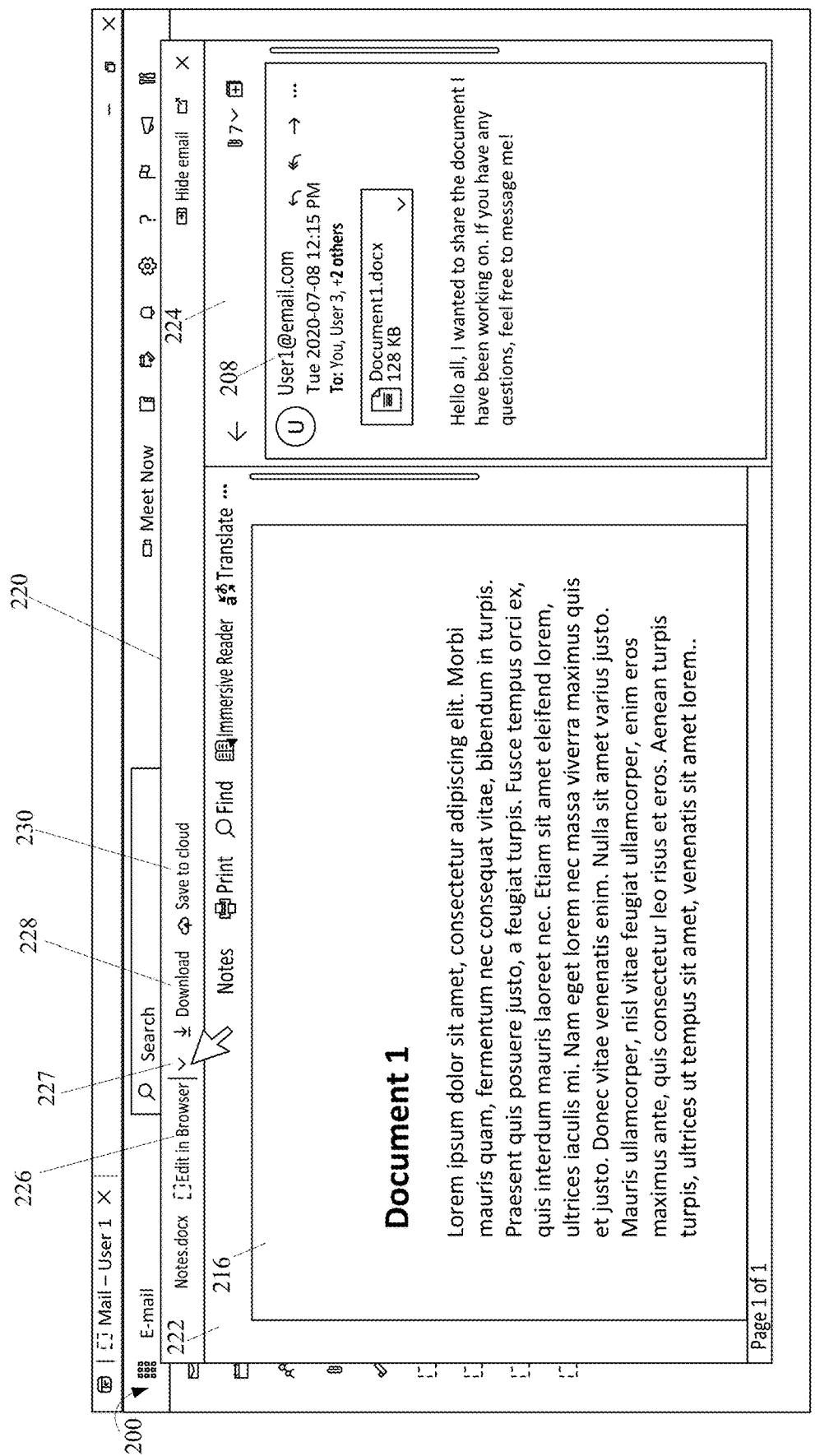
FIG. 3B illustrates a preview pane for the file attached to the electronic communication that includes a one-click edit control element and one or more additional edit control elements accessible via the preview pane.

FIGS. 3A-3D illustrate another example user interface flow for viewing and editing the file 216 attached to the electronic communication 208. FIG. 3A illustrates the same user interface 200 of the communication application 114 described with respect to FIG. 2A, where the file 216 attached to the electronic communication 208 that is displayed within the electronic communication viewing pane 210 may be selected causing the preview pane 220 to be displayed as shown in FIG. 3B.

Referring now to FIG. 3B, the preview pane 220 described in greater detail with respect to FIG. 2B may be at least partially overlaid on the user interface 200 and include the file previewer 222 displaying the file 216, the communication previewer 224 displaying the electronic communication 208, and the plurality of control elements. The plurality of control elements may include the edit control element 226, the download control element 228 and the save control element 230. Additional edit control elements may also be accessible via the preview pane 220 as indicated by the user interface element 227. In this example user interface flow, the user interface element 227 may be selected as shown in FIG. 3B to access the one or more additional control elements, causing a pull-down menu 300 or other similar menu to be displayed that includes the one or more additional control elements as options for user selection as shown in FIG. 3C.

Figure 3C:
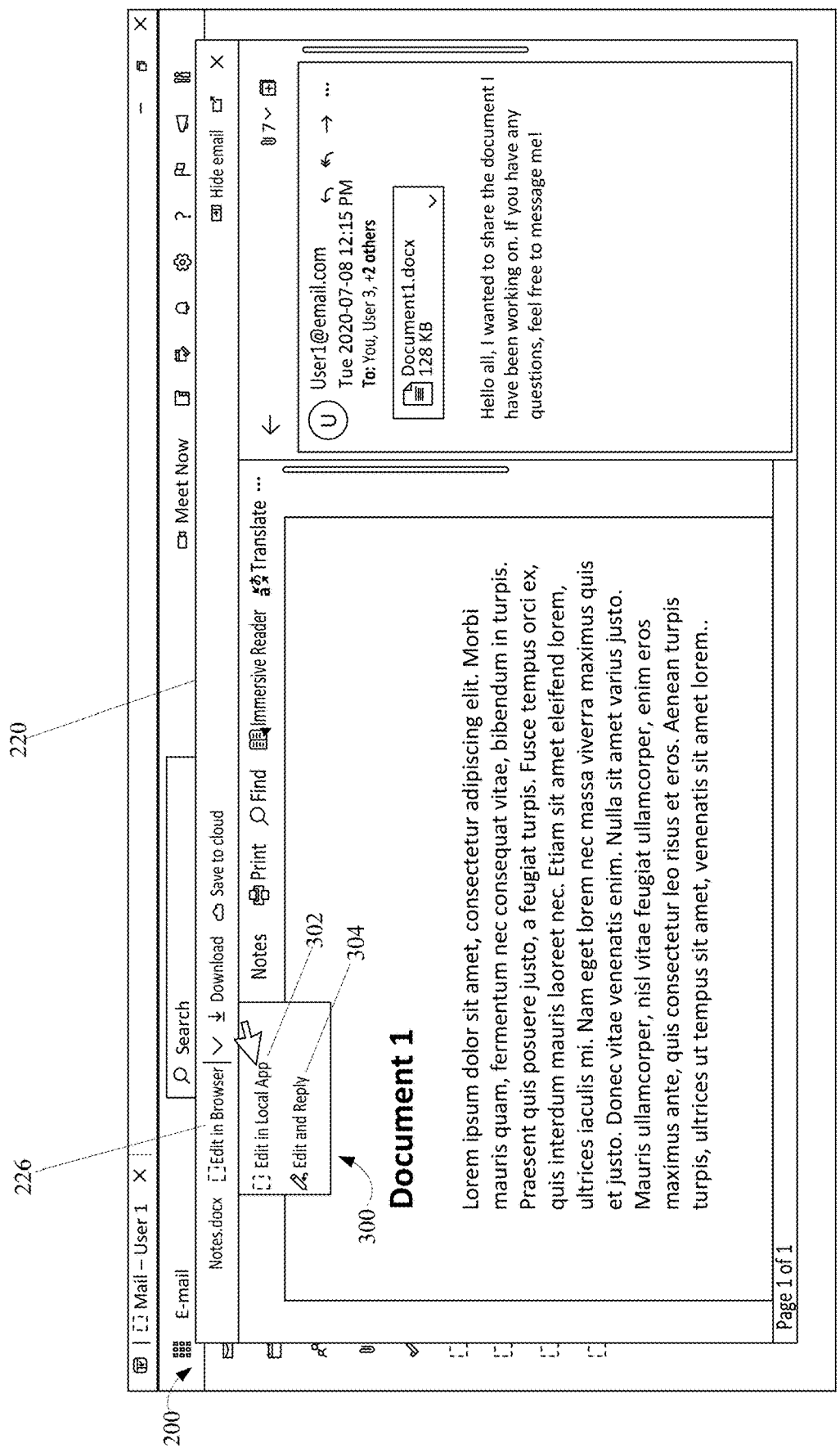
FIG. 3C illustrates examples of the one or more additional edit control elements accessible via the preview pane.
Figure 3D:
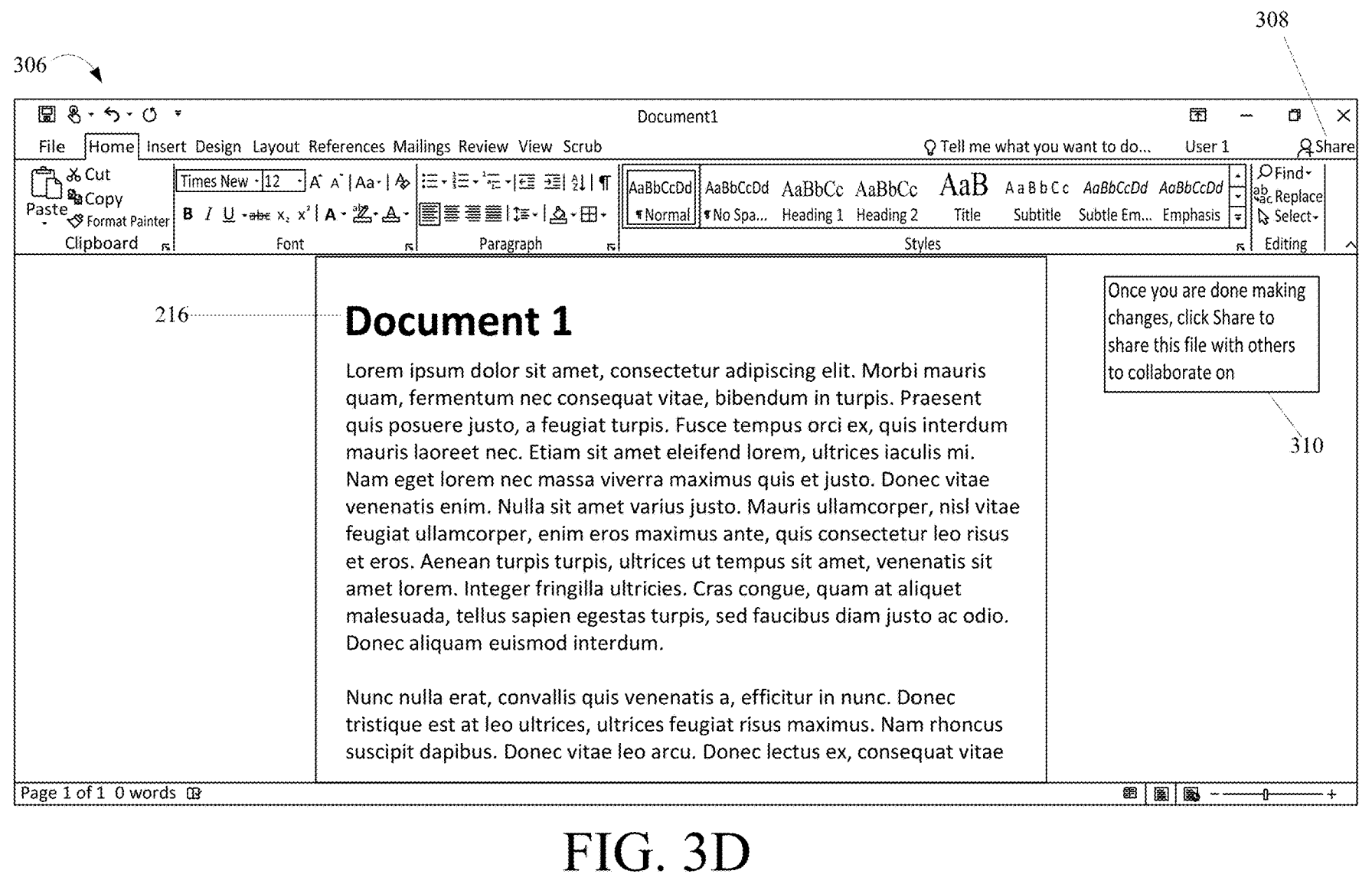

Referring now to FIG. 3C, the one or more additional edit control elements 302, 304 included as selectable options in the menu 300 may represent alternative file editing options to the edit control element 226 that is displayed more prominently in the preview pane 220 and enables the one-click upload and edit functionality. As previously discussed, the edit control element 226 may be a default option for editing the file 216. In other examples, the edit control element 226 may represent a user preference or a most recent file editing option selected by the user. For example, and as illustrated in FIG. 3C, the edit control element 226 ("Edit in Browser") may be an option to edit the file 216 in a web browser using a thin version of the productivity application 116 (e.g., a web productivity application) having functionalities to enable editing of the file 216.

A first alternative edit control element 302 ("Edit in Local App") that is displayed in the menu 300 may include a selectable option to edit the file 216 using a thick version of the productivity application 116, also referred to herein as a local productivity application, installed on the computing device 102. In some aspects, this first alternative edit control element 302 may only be provided if a user, based on the user's account with the hosted services, has appropriate access (e.g., has a required license) for the local productivity application to be installed and run on the computing device 102. Similar to when the edit control element 226 is selected, selection of this first alternative edit control element 302 can cause an automatic upload of the file 216 to a cloud storage location (e.g., one of the data storage locations 128) provided by the storage service 108. In other examples, the first alternative edit control element 302 ("Edit in Local App") may instead be the one-click edit control element 226 displayed in the preview pane 220 and the one-click edit control element 226 ("Edit in Browser") may be the first alternative edit control element 302 displayed in the menu 300 upon selection of the user interface element 227.

A second alternative edit control element 304 displayed in the menu 300 may include an option to edit and reply ("Edit and Reply"). If selected, an instance of a productivity application user interface for the file type that includes functionality of the application may be launched within the file previewer 222 of the preview pane 220 to allow editing of a newly created copy of the file 216 using the functionalities of the application concurrently with generation of a reply to the electronic communication 208, where the edited copy of the file 216 is attached to the reply communication for sending via the communication application 114. However, when using this alternative editing option, the newly created copy of the file 216 may be stored only with relation to the user's mailbox by the electronic communication server 120 rather than uploaded to the cloud storage location provided by the storage service 108.

As shown in FIG. 3C, the first alternative edit control element 302 ("Edit in Local App") may be selected. In response to the selection of the first alternative edit control element 302, the file 216 may be automatically uploaded to a cloud storage location provided by the storage service 108. A link that points to the cloud storage location of the file 216 may be saved as a property of the file 216 that is stored with the electronic communication 208 in association with the user's inbox folder 204 within the databases 122 by electronic communication server 120. Resultantly, a connection between the electronic communication 208 and the uploaded version of the file 216 at the cloud storage location may be persistently maintained. In addition to automatically uploading the file 216, upon the selection of the first alternative edit control element 302, the local productivity application installed on the computing device 102 may be executed and a user interface 306 of the local productivity application may be displayed as shown in FIG. 3D.

Referring now to FIG. 3D, the copy of the file 216 at the cloud storage location may be opened and displayed within the user interface 306 of the local productivity application. The user may utilize functionalities of the local productivity application to edit the file 216, and any edits to the file 216 are saved to the copy of the file 216 at the cloud storage location.

In some examples, the user interface 306 may also include a share control element 308 that is selectable to enable a link to the file 216 at the cloud storage location to be shared with one or more other users and an associated prompt 310 to encourage use of the share control element 308. The share control element 308 and associated prompt 310 displayed in the user interface 306 of the local productivity application may include similar functionalities and features of the share control element 234 and the prompt 326 displayed in the user interface 232 of the web productivity application described in detail with respect to FIG. 2C. Once the link to the file 216 saved at the cloud storage location has been shared with other users, each of those users may collaborate on this single copy of the file 216 at the cloud storage location rather than relying on the conventional back and forth receiving, downloading/uploading, editing, re-attaching and sending of different versions of the file 216.

Figure 4:
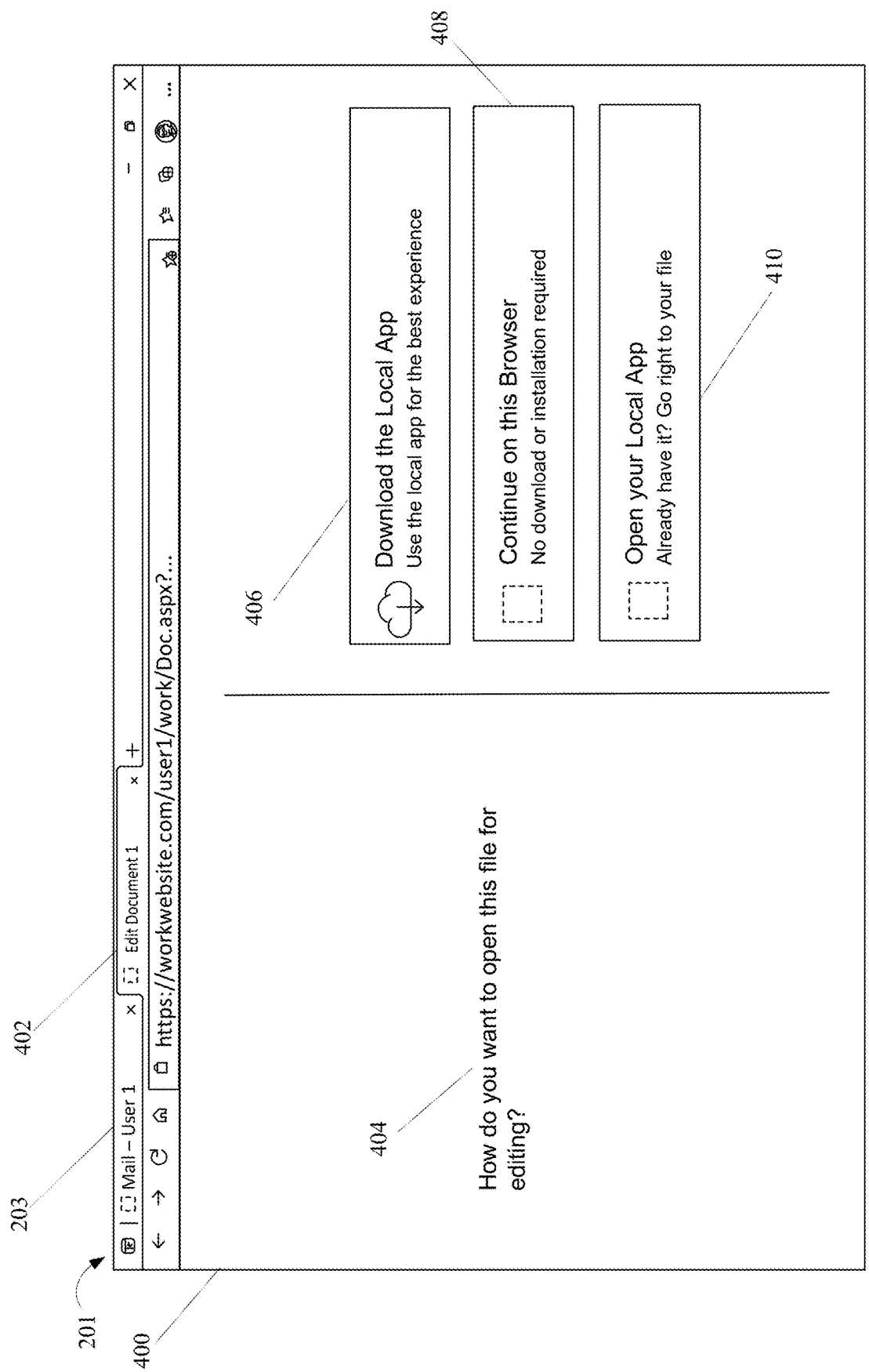
FIG. 4 illustrates an example page displayed in response to a user selection of a file attached to an electronic communication.

FIG. 4 illustrates an example page 400 displayed in response to the selection of the file 216 attached to the electronic communication 208. In some example user interface flows, rather than displaying the preview pane 220 in response to the selection of the file 216 from the electronic communication 208 displayed in the electronic communication viewing pane 210 as shown and described above with respect to FIGS. 2B and 3B, the page 400 may instead be displayed in a new tab 402 (e.g., in a different tab than the tab 203 the communication application 114 is launched in) of the web browser 201.

The page 400 may include a prompt 404 to select a method to open the file 216 for editing and selectable options 406, 408, 410 corresponding to each available method. A first option 406 may include for a latest version of a local productivity application having an associated functionality to edit the file 216 to be downloaded for installation on the computing device 102. If the user has an appropriate subscription or license (e.g., based on a user's account), selection of the first option 406 may cause the latest version to be installed on the computing device 102 and executed to enable editing of the file 216. For example, a copy of the file 216 may be automatically uploaded to the cloud storage location and opened in a local productivity application. For example, the copy of the file 216 may be provided for display and subsequent editing in the user interface 306 of the local productivity application as shown in FIG. 3D. If the user does not have an appropriate subscription or license, then an error message may be presented within the page 400 and the user may be prompted to select another option, such as the second option 408.

The second option 408 may include to continue in the web browser 201. Selection of the second option 408 may cause a web productivity application having an associated functionality to edit the file 216 to be opened or launched in a new tab of the web browser 201 to enable editing of the file 216. For example, a copy of the file 216 may be automatically uploaded to the cloud storage location and opened (e.g., provided for display) in the user interface 232 of the web productivity application in the new tab 231 of the web browser 201 as shown in FIG. 2C. In some examples, the new tab 231 may replace the tab 402 displaying the page 400 or the tab 402 may otherwise be removed or deleted from view within the web browser 201.

A third option 410 may include to open a local productivity application having an associated functionality to edit the file 216 that is already installed on the computing device 102. Selection of the third option 410 may cause a copy of the file 216 to be automatically uploaded to the cloud storage location and the local productivity application to be executed on the computing device 102 to enable editing of the file 216. For example, the copy of the file 216 may be displayed within the user interface 306 of the local productivity application as shown in FIG. 3D.

In some examples, the page 400 may be displayed at least a first time a file attachment of an electronic communication is selected from the electronic communication viewing pane 210 within the user interface 200 of the communication application 114. The user's selected option may be set as a preferred or default option for file editing. For example, when subsequent file attachments are selected, the preview pane 220 may be displayed, and the user's selected option may be the option that is displayed as the edit control element 226 in the preview pane 220. In other examples, the page 400 may be displayed at periodic intervals to capture changes in a user's subscription or license or a user's preference.

Figure 5:
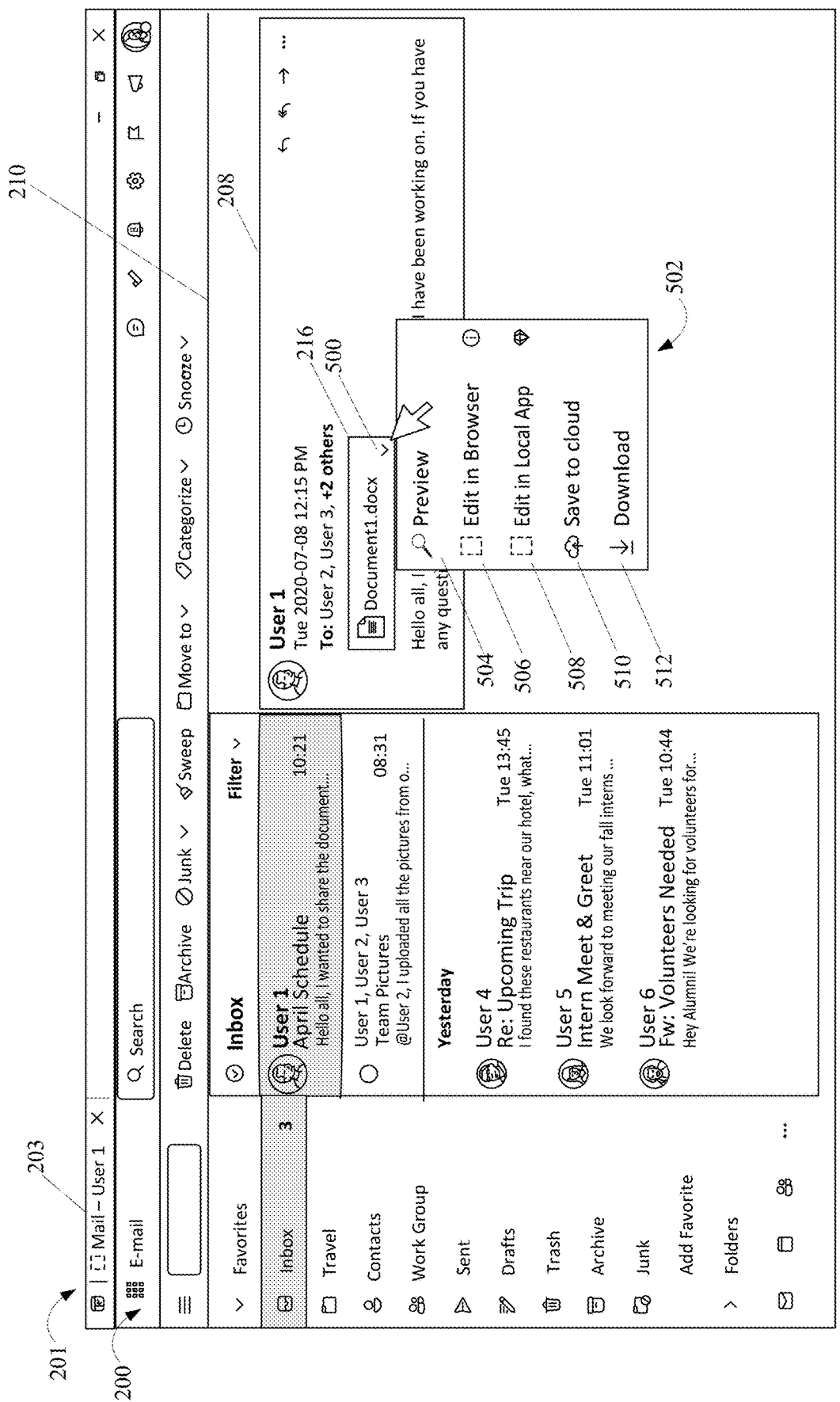
FIG. 5 illustrates a further example user interface of an electronic communication application displaying an electronic communication with a file attached that includes selectable edit control elements.

FIG. 5 illustrates a further example user interface flow for interacting with the file 216 attached to the electronic communication 208. For example, FIG. 5 illustrates the same user interface 200 of the communication application 114 launched in the tab 203 of the web browser 201 that is described in detail with respect to FIG. 2A except that, in this example, the user selects a user interface element 500 that may be displayed in conjunction with the file 216 attached to the electronic communication 208 in the electronic communication viewing pane 210. Upon selection of the user interface element 500, a menu 502 including a plurality of selectable options 504, 506, 508, 510, 512 for interacting with the file 216 may be displayed. The menu 502 may be a pull-down menu, a pop-up menu, or other similar style menu.

A first option 504 in the menu 502 may be a preview control element that is selectable to preview the file 216. In response to a selection of the first option 504, a preview pane, such as the preview pane 220 illustrated and described with respect to FIGS. 2B and 3C, may be displayed.

A second option 506 and a third option 508 in the menu 502 may be edit control elements selectable to edit the file 216. The second option 506 may be an edit control element selectable to edit the file 216 in the web browser 201 using a web productivity application having an associated functionality to edit the file 216. In response to a selection of the second option 506, the web productivity application can be launched in a new tab of the web browser 201 and the file 216 may be displayed for editing within a user interface of the web productivity application, such as the user interface 232 of the web productivity application launched in new tab 231 of the web browser 201 described with respect to FIG. 2C. The third option 508 may be an edit control element selectable to edit the file 216 in a local productivity application having an associated functionality for editing the file 216 that is installed on the computing device 102. In response to a selection of the third option 508, the local productivity application may be executed on the computing device 102 and the file 216 may be displayed for editing within a user interface of the local productivity application, such as the user interface 306 described with respect to FIG. 3D.

In response to a selection of either the second option 506 or the third option 508, a copy of the file 216 may be automatically uploaded and saved to a cloud storage location provided by the storage service 108. This copy of the file 216 may be the file 216 provided for display for editing within the web or local productivity applications such that any edits are saves to the copy of the file 216 at the cloud storage location. A link to the file 216 at the cloud storage location may be included as a property of the original file that is stored with the electronic communication 208 in association with the user's mailbox within the databases 122 by the electronic communication server 120 to enable persistent maintenance of a connection between the electronic communication 208 and the copy of the file 216 at the cloud storage location. In some examples, only one of the second option 506 or the third option 508 may be included based on a default option chosen or based on recent selections or preferences indicated by the user.

The fourth option 510 in the menu 502 may be a save control element that is selectable to upload and save the file 216 to a cloud storage location provided by storage service 108. In some examples, the user may have previously edited the file 216 by selecting one of the edit options 506, 508 in the menu 502 or by selecting other edit control elements or page options (e.g., edit control elements 226, 302, 304 discussed with respect to FIGS. 2B, 3B and 3C or page options 406, 408, 410 discussed with respect to FIG. 4) and thus the file 216 has already been automatically uploaded and saved to the cloud storage location. Additionally or alternatively, the file 216 may have previously been uploaded and saved to the cloud storage location by the user by selecting the fourth option 510 in a prior interaction with the file 216 or by selecting the save control element 230 discussed previously with respect to FIGS. 2B and 3B. In such examples where the file 216 has already been uploaded and saved to the cloud storage location, the fourth option 510 may not be included within the menu 502 or it may be altered from a selectable option to an indication that the file 216 has already been saved to a cloud storage location.

The fifth option 512 in the menu 502 may be a download control element selectable to enable the file 216 to be downloaded and saved to local storage on the computing device 102. In some examples, there may be more or less options included in the menu 502 than illustrated.

FIGS. 6A-6B illustrate an example user interface flow for responding to the electronic communication 208 that included the file 216 as an attachment after the file 216 has been uploaded and edited. For example, FIG. 6A illustrates the same user interface 200 of the communication application 114 launched in the tab 203 of the web browser 201 that is described in detail with respect to FIG. 2A except that, in this example, the user selects a reply control element 600 from the plurality of interactive control elements 214 included within the electronic communication viewing pane 210 to reply to the electronic communication 208 that included the file 216 as an attachment. In other examples, the user may select a reply all control element or a forward control element from the plurality of interactive control elements 214 included within the electronic communication viewing pane 210.

Referring now to FIG. 6B, in response to the selection of the reply control element 600, a reply communication 602 may be generated and displayed within the electronic communication viewing pane 210 of the user interface 200. In some examples, the reply communication 602 may be displayed as part of a communication thread that includes the electronic communication 208 as illustrated. Additionally, in response to a determination that the file 216 has been uploaded to the cloud storage location and edited (e.g., where the edits are saved to the file 216 at the cloud storage location), the reply communication 602 may be generated to include a link 604 to the file 216 at the cloud storage location along with a prompt 606 to share the modified copy of the file 216 with at least a user who initially sent the file 216 (e.g., at least a sender of the electronic communication 208) as shown in FIG. 6B. In some examples, the prompt 606 may further encourage sharing with all users associated with the electronic communication 208 (e.g., the sender and one or more other recipients of the electronic communication).

The determination that the file 216 has been uploaded to cloud storage may be based on an identification of the link to the file 216 at the cloud storage location within the property of the file 216 (e.g., the original version of the file 216 received as the attachment) that is stored with the electronic communication 208 in association with the user's mailbox within the databases 122 by the electronic communication server 120. The determination that the file 216 has been edited may be based on a comparison of a version of the original file 216 that is stored with the electronic communication 208 in association with the user's mailbox and a version of the copy of the file 216 at the cloud storage location.

In some examples, the file 216 may have been uploaded to the cloud storage location, but no edits to the file 216 have been made. In such examples, the link 604 and the prompt 606 to share the file 216 may again be included in the reply communication 602 to encourage sharing of the link 604 among associated users, even though no edits have yet been made, to enable collaboration on a single copy of the file 216 (e.g., the file 216 at the cloud storage location) moving forward.

If the user does not want to share the link 604, the user may select a delete control element 608 associated with the link 604 and the prompt 606 and displayed within the reply communication 602. Otherwise, if the user sends the reply communication 602 without selecting the delete control element 608, then the link 604 may be sent with the reply communication 602.

Once the file 216 is in link form and has been shared among associated users, no further sharing needs to be done as the associated users now have access and capability to edit and collaborate via the single copy of the file 216 at the cloud storage location. Each time one of the users selects this link from the reply communication 602 to view and/or edit the file 216, the copy of the file 216 at the cloud storage location may be opened in a web productivity application launched in a new tab in a web browser and/or in a local productivity application executing on the computing device 102. Upon the file 216 being opened, that user may be notified of any edits to the file 216 made by others since that user last viewed and/or edited the file 216, for example. In other examples, once the associated users receive the link to the file 216 and/or select the received link to the file 216 within the reply communication 602, the link may be stored as a property of the original version of the file 216 attached to the electronic communication 208 that is stored with the electronic communication 208 within the databases 122 by the electronic communication server 120 in association with the respective associated users' mailboxes to establish a connection between the file 216 uploaded to the cloud storage location and the electronic communication 208 that is persistently maintained.

FIG. 7 illustrates an example of the preview pane 220 displaying the file 216 subsequent to the file 216 being uploaded to cloud storage and edited. A period of time (e.g., minutes, hours, days, weeks, months, or years) after a copy of the file 216 is uploaded to a cloud storage location and edited, the user may return back to the communication application 114 and select, via the user interface 200, to open the electronic communication 208 where the file 216 originated as an attachment. The user may then further select the file 216 directly to preview the file 216 (e.g., similar to the selections shown in FIGS. 2A and 3A) or select an option from a menu to preview the file 216 (e.g., similar to selection of the first option 504 in menu 502 shown in FIG. 5).

In one aspect and as shown in FIG. 7, in response to the selection to preview the file 216, the original version of the file 216 received as the attachment of the electronic communication 208 may initially be displayed in the file previewer 222 of the preview pane 220. For example, the version of the file 216 stored in association with the user's mailbox within the databases 122 by the electronic communication server 120 is retrieved for display within the file previewer 222 of the preview pane 220. In this example, the communication previewer 224 shown in FIGS. 2B and 3B of the preview pane 220 may be hidden or collapsed from view in the preview pane 220.

However, based on an identification of the link to the file 216 at the cloud storage location within the properties of the original file 216 stored with the electronic communication 208 in association with the user's mailbox, a determination is made that a copy of the file 216 has been previously been uploaded and a comparison of the original file version stored at the databases 122 the electronic communication server 120 to the uploaded file version stored at the cloud storage location may reveal that edits or updates to the file 216 have been made. Therefore, to prevent user confusion and to remind or otherwise alert the user, a notification 700 can be displayed within the preview pane 220 or as a separate pop-up window, for example, where the notification 700 may indicate that a copy of this file 216 at a cloud storage location has been updated. In some examples, additional details regarding the copy stored at a cloud storage location can also be provided, such as user that initiated the storage, a date and time of storage, a date and time of last edit, and a user who performed the last edit. In further examples, the notification 700 can include a selectable link to access the copy of the file 216 stored at a cloud storage location. Additionally, based on the determination that the file 216 has previously been uploaded, the save control element 230 of the preview pane 220 (e.g., see FIGS. 2B and 3B) may be altered to instead display an indication 702 that the file 216 has already been saved to a cloud storage location.

In another aspect, in response to the direct selection of the file 216 or an option to preview the file 216, the latest version of the file 216 saved at the cloud storage location may be retrieved and displayed within the file previewer 222 of the preview pane 220. For example, the link to the file 216 may be retrieved to access the latest version of the file 216 at the cloud storage location from the properties of original file 216 that is stored with the electronic communication 208 in association with the user's mailbox at the databases 122 by the electronic communication server 120. A notification similar to the notification 700 may be displayed, however this notification may instead indicate the file 216 displayed in the file previewer 222 of the preview pane 220 is a latest version edited (e.g., is not the original version sent). The notification may also include a selectable option to view the original version of the file 216 sent as the attachment to the electronic communication 208.

In a further aspect, in response to the direct selection of the file 216 or an option to preview the file 216, a toggle-based interface can be provided within the preview pane 220. The toggle-based interface may display and allow the user to toggle between both the original version of the file 216 sent as the attachment to the electronic communication 208 and a latest updated version of the file 216 from the cloud storage location. In some examples, multiple versions of the file 216 saved at the cloud storage location may be provided within the toggle-based interface to show a progression of edits.

If in any of the above discussed aspects, a selection is made to edit the file 216 (e.g., via a selection of the one-click edit control element 226 or the alternative edit control element 302 in the preview pane 220 or a selection of one of the edit options 506, 508 from the menu 502 in the electronic communication viewing pane 210), the latest version of the copy of the file 216 at the cloud storage location may be automatically opened within a productivity application for editing the file 216.

In another example, the file 216 may have been previously uploaded to cloud storage but not edited. For example, the user may have selected a save function or control element to interact with the file 216 rather than an edit function. In such an example, the file 216 may be similarly uploaded to the cloud storage location and the link saved as the property of the file 216 to cause persistent maintenance of the connection between the electronic communication 208 and the uploaded version of the file 216 at the cloud storage location. Therefore, when the user subsequently selects to preview the file 216 or otherwise interact with the file 216, the link is detected within the properties of the original file 216 stored with the electronic communication 208 in association with the user's mailbox, and that stored copy can be opened using the link rather than uploading and opening an entirely new copy of the file 216.

FIGS. 2A through 7 illustrate example user interfaces of web and local applications for communication and productivity applications and associated user interface flows to facilitate establishment and maintenance of a connection between file attachments uploaded to cloud storage and associated electronic communications. However, the user interfaces and associated flows that may be implemented by a system such as system 100 of FIG. 1 are not limited to these examples.

FIG. 8 illustrates an example method 800 for establishing a persistent connection between file attachments uploaded to cloud storage and associated electronic communications to prevent creation of duplicate files. The method 800 may be provided by one or more components of the system 100 described in FIG. 1, including at least the communication service 106 that includes the electronic communication server 120 for allowing electronic mail and other electronic communications to be exchanged between the various users and the databases 122 associated with the electronic communication server 120 for storing the electronic communications.

The method 800 begins at operation 802 where an electronic communication 124, received by a user (e.g., a recipient), that includes a file 126 as an attachment is stored by the electronic communication server 120. For example, the electronic communication 124 and the file 126 may be stored in association with an inbox folder of the user's mailbox in one of the databases 122 by the electronic communication server 120. The electronic communication 124 and the file 126 may also be stored in association with a sent folder of the sender's mailbox and/or inbox folders of one or more other recipients' mailboxes in the databases 122 by the electronic communication server 120.

At operation 804, the electronic communication 124 is provided for the display to the user via a user interface of a communication application 144, such as user interface 200 of the communication application 114 executing on the computing device 102 of the user. The user interface 200 may include an edit function selectable to edit the file 126. In some examples, the edit function may be provided for display within a preview pane 220 of the user interface 200 as a one-click edit control element 226 in conjunction with a selectable user interface element 227 as shown in FIGS. 2B and 3B, where selection of the element 227 may causes display of the menu 300 that includes additional edit control elements 302, 304 that represent alternative file editing options for selection as shown in FIG. 3C. Additionally or alternatively, the edit function may be provided for display within the user interface 200 as options 504, 506 of a menu 502 that is presented upon selection of a user interface element 500 displayed in conjunction with the file 126 within the electronic communication viewing pane 210 of the user interface 200 as shown in FIG. 5. The edit function may also be displayed with one or more other types of functions selectable to interact with the file 126, such as a save function (e.g., save control element 230).

At operation 806, an indication of a selection of the edit function may be received from the communication application 114. In response, at operation 808, a copy of the file 126 may be uploaded to a cloud storage location, such as one of the data storage locations 128 provided by the storage service 108.

At operation 810, a link 130 to the file 126 at the cloud storage location may be stored as a property of the file (e.g., as one of file properties 132) stored by the electronic communication server 120 at operation 802. For example, the link 130 may be stored as a property of the file 126 that was stored with the electronic communication 124 in association with the inbox folder of the user's mailbox in the databases 122 by the electronic communication server 120. Resultantly, a connection between the electronic communication 124 and the uploaded copy of the file 126 at the cloud storage location may be persistently maintained within the user's mailbox over time. That way, when the user later opens the communication application 114 and returns to the same electronic communication 124 and file 126 in their inbox folder, the connection may remain hours, days, weeks, months, and years later, as discussed in more detail with respect to operation 814. In another example, the file 126 may be similarly uploaded to the cloud storage location and the link stored as the property of the file 126 to cause persistent maintenance of the connection between the electronic communication 124 and the uploaded version of the file 126 at the cloud storage location within the user's mailbox over time if another function selectable to interact with the file 126, such as a save function, is initially selected.

In addition to uploading the copy of the file 126 and storing the link 130 in response to receiving the indication of the selection of the edit function at operations 808 and 810, respectively, the copy of the file 126 at the cloud storage location may be opened in a productivity application 116 to enable editing at operation 812. For example, the electronic communication server 120 may transmit a signal that includes the link 130 to a server associated with the productivity application 116 to cause the productivity application 116 to launch, if not already launched, and open the copy of the file 126 at the cloud storage location using the link 130. The productivity application 116 may a productivity application 116 having associated functionality for creating and editing the file 126 (e.g., based on the file type). The productivity application 116 may be a web application or a local application, where the type launched to open the copy of the file 126 may be based on a type of the edit function selected by the user, a default setting, a user preference, and/or user access (e.g., subscription to) to one or the other. Any edits made to the file 126 using the functionalities of the productivity application 116 may be saved to the copy of the file 126 at the cloud storage location. In some examples, the user may be prompted to share the link 130 to the file 126 using a share feature or functionality of the productivity application 116 as shown in FIGS. 2C and 3D. In further examples, the user may be prompted to share the link 130 to the file 126 within a reply communication to the electronic communication 124 generated at the communication application 114 as shown in FIGS. 6A and 6B.

At a later time (e.g., after a few minutes, hours, days, week, or years), an indication of a subsequent selection of the edit function may be received from the communication application 114, and in response, the copy of the file 126 at the cloud storage location may be opened in the productivity application 116 to enable editing at operation 814. For example, the user may re-open the electronic communication 124 in the communication application 114. The original file 126 stored with the electronic communication 124 may be retrieved from the databases 122 by the electronic communication server 120 for initial display within the user interface of the communication application 114. However, when the edit function is subsequently selected, the copy of the file 126 at the cloud storage location is opened in the productivity application 116 for editing rather than the original file received as the attachment. For example, the electronic communication server 120 may transmit a signal that includes the link 130 to a server associated with the productivity application 116 to cause the productivity application 116 to launch, if not already launched, and open the copy of the file 126 at the cloud storage location using the link 130. This ensures that the user continues to work off of a latest, up-to-date version rather than the original file.

As described in greater detail with respect to FIG. 9, after the file 126 received as the attachment to the electronic communication is uploaded and edited and the user subsequently interacts with the electronic communication 124, the communication service 106 may detect that a copy of this file 126 has already been uploaded and exists at a cloud storage location. This detection causes the copy of the file 126 at the cloud storage location to be opened in the productivity application 116 at operation 814 in response to receiving the indication of the subsequent selection of the edit function. Additionally or alternatively, an indication that a different type of selection may be received, such as a selection to reply to the electronic communication 124 or a selection to preview the file 126, that may cause other operations to be performed based on the detection that the copy of this file 126 has already been uploaded and exists at the storage location as described in detail in FIG. 9 below.

In other examples, where the file 126 is uploaded to the cloud storage location and the link 130 stored as the property of the file 126 in response to another function selectable to interact with the file 126, such as a save function, being selected, an indication of a subsequent selection of one of the functions selectable to interact with the file 126 may be received that causes the copy of the file 126 at the cloud storage location to be opened rather than uploading and opening a new copy of the file 125.

FIG. 9 illustrates an example method 900 for detecting a presence of an uploaded copy of a file attached to an electronic communication and preventing duplication of the file. In some examples, the method 900 may be provided by one or more components of the system 100 described in FIG. 1, including at least the communication service 106 that includes the electronic communication server 120 for allowing electronic mail and other electronic communications to be exchanged between the various users and the databases 122 associated with the electronic communication server 120 for storing the electronic communications.

The method 900 begins at operation 902 where an indication of a selection associated with an electronic communication 124 that includes a file 126 as an attachment may be received from a communication application 114. At operation 904, a copy of the file 126 may be detected as having been previously uploaded to a cloud storage location, such as one of the data storage locations 128 provided by the storage service 108. For example, file properties 132 of the file 126 stored with the electronic communication 124 in the databases 122 by the electronic communication server 120 may be referenced, and the detection may be based on an identification of a link 130 to the file 126 at the cloud storage location that is stored as one of the file properties 132.

At decision 906, a decision as to a type of the selection is made. In some examples, if the selection is to reply to the electronic communication 124, such as shown in FIG. 6A, then the link 130 to the file at the cloud storage location identified as part of the detection process at operation 904 may be retrieved at operation 908. At operation 910, a reply communication to the electronic communication may be generated that includes the link 130 and a prompt to share the link. The reply communication may then be provided for display in the user interface of the communication application at operation 911. The reply communication may be similar to the reply communication 602 shown in FIG. 6B. The user may input a message within the reply communication and send causing the link 130 to be shared with the original sender.

In other examples, if the selection is to edit the file, then the link 130 to the file 126 at the cloud storage location identified as part of the detection process at operation 904 may be retrieved at operation 912. The link 130 may be used at operation 914 to open the copy of the file 126 at the cloud storage location in a productivity application 116 to enable editing. For example, the electronic communication server 120 may transmit a signal that includes the link 130 to a server associated with the productivity application 116 to cause the productivity application 116 to launch, if not already launched, and open the copy of the file 126 at the cloud storage location using the link 130.

In further examples, if the selection is to preview the file, then at operation 916, the file 126 stored with the electronic communication 124 in the databases 122 by the electronic communication server 120 (e.g., the original file received as the attachment) may be retrieved and provided for display in a preview pane 220 within a user interface 200 of the communication application 114. At operation 918, a notification that the copy of the file 126 at the cloud storage location has been updated may also be provided for display, such as the notification shown in FIG. 7.

FIG. 10 is a block diagram illustrating physical components (e.g., hardware) of a computing device 1000 with which aspects of the disclosure may be practiced. For example, the computing device 1000 may illustrate components of processing devices or servers of the system 100, including the computing devices 102 and the servers of the hosted services, such as the electronic communication server 120 of the communication service 106. The computing device components described below may be suitable for the computing devices and systems described above. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories.

The system memory 1004 may include an operating system 1005 and one or more program modules 1006 suitable for running software application 1020, such as the applications 112 run by the computing devices 102, as well as the one or more virtual machines and/or one or more components associated with the hosted services that are supported by the systems described herein. The operating system 1005, for example, may be suitable for controlling the operation of the computing device 1000.

Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, solid-state drives, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., application 1020) may perform processes including, but not limited to, the aspects, as described herein. Other program modules that may be used in accordance with aspects of the present disclosure may include virtual machines, hypervisors, and other types of applications such as electronic mail and contacts applications, word processing applications, spreadsheet applications, note taking applications, database applications, slide presentation applications, drawing or computer-aided application programs, etc.

Furthermore, embodiments, or portions of embodiments, of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As previously discussed, the aspects and functionalities described herein may operate over distributed systems such as the system 100 described in FIG. 1, where application functionality, memory, data storage and retrieval and various processing functions may be operated remotely from each other over a distributed computing network, such as the Internet or an intranet. Resultantly, users may utilize associated computing devices 102 to interact with the hosted services, including the communication service 106, the storage service 108, and the productivity services 110. User interfaces and information of various types may be displayed via on-board computing device displays or via remote display units associated with such computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 11A and 11B below include an example computing device 102 that may be utilized to execute locally installed applications or run a web browser through which web applications are accessible to send and receive electronic communications as well as edit files included as attachments in the electronic communications, among other functionalities.

FIGS. 11A and 11B illustrate a mobile computing device 1100, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display).

If included, a side input element 1115 allows additional user input. The side input element 1115 may be a rotary switch, a button, or any other type of manual input element. Additionally, if included, an on-board camera 1130 allows further user input in the form of image data captured using the camera 1130. In alternative aspects, mobile computing device 1100 may incorporate more or less input elements. For example, the display 1105 may not be a touch screen in some embodiments.

In yet another alternative embodiment, the mobile computing device 1100 is a portable phone system, such as a cellular phone. The mobile computing device 1100 may also include a keypad 1135. The keypad 1135 may be a physical keypad or a "soft" keypad generated on the touch screen display.

In various embodiments, the output elements include the display 1105 for showing a graphical user interface (GUI), a visual indicator 1120 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device (e.g., a peripheral device). These input and/or output ports are also referred to as peripheral device ports 1140 as illustrated in FIG. 11B.

FIG. 11B is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs 1166 include phone dialer programs, e-mail programs, personal information management (PIM) programs, word processing programs, spreadsheet programs, Internet browser programs, messaging programs, and so forth. In an aspect, the application programs 1166 may also include the applications 112 by which the hosted services may be accessed over a network. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100 described herein.

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 described with reference to FIG. 11A may be used to provide visual notifications, and/or an audio interface 1174 may be used for producing audible notifications via the audio transducer 1125 described with reference to FIG. 11A. These devices may be directly coupled to the power supply 1170 so that when activated, they remain on for a duration dictated by the notification mechanism even though the processor(s) (e.g., processor 1160 and/or special-purpose processor 1161) and other components might shut down for conserving battery power. The visual indicator 1120 may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of an on-board camera 1130 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a computing device in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

Example aspects described herein include a system. An example system includes at least one processor, and at least one memory coupled to the at least one processor. The memory may store instructions that, when executed by the at least one processor, cause the system to store, by an electronic communication server, an electronic communication and a file attached to the electronic communication, and provide the electronic communication for display in a user interface of a communication application associated with the electronic communication server, where the user interface includes an edit function selectable to edit the file. The instructions, when executed by the at least one processor, may also cause the system to receive an indication of a selection of the edit function from the communication application, and based on receiving the selection of the edit function, upload a copy of the file to a cloud storage location, store a link to the copy of the file at the cloud storage location as a property of the file stored by the electronic communication server, and cause the copy of the file at the cloud storage location to be opened in a productivity application to enable editing. The instructions, when further executed by the at least one processor, may also cause the system to cause the copy of the file at the cloud storage location to be opened in the productivity application to enable editing in response to receiving, from the communication application, an indication of a subsequent selection of the edit function to edit the file.

In some examples, in response to receiving the indication of the subsequent selection of the edit function, the file stored by the electronic communication server is referenced, the link to the copy of the file at the cloud storage location is identified within one or more properties of the file referenced, and based on the identification of the link, the copy of the file is detected as being uploaded to the cloud storage location, where the detection causes the copy of the file at the cloud storage location to be opened in the productivity application. A signal may be transmitted from the electronic communication server to a server associated with the productivity application that causes the productivity application to launch and open the copy of the file at the cloud storage location, where the signal includes the link to the copy of the file at the cloud storage location. A prompt may be caused to be provided for display in a user interface of the productivity application, the prompt indicating to share the link to the copy of the file at the cloud storage location using a share function of the productivity application.

In other examples, subsequent to the upload of the copy of the file to the cloud storage location, an indication of a selection to reply to the electronic communication may be received from the communication application, a reply communication that includes the link may be generated, and the reply communication and a prompt to share the link via the reply communication may be provided for display in the user interface of the communication application. Subsequent to the upload of the copy of the file to the cloud storage location, indication of a selection to preview the file may be received from the communication application, and both the file stored by the electronic communication server and a notification to indicate that the copy of the file at the cloud storage location has been updated from the file stored by the electronic communication server may be provided for display in the user interface of the communication application. Subsequent to the upload of the copy of the file to the cloud storage location, an indication of a selection to preview the file may be received from the communication application, and both the file stored by the electronic communication server in a first view, and the copy of the file at the cloud storage location in a second view may be provided for display in the user interface of the communication application, where a user is enabled to toggle between the first view and the second view. Subsequent to the upload of the copy of the file to the cloud storage location, an indication of a selection to preview the file may be received from the communication application, and the copy of the file at the cloud storage location and a selectable option to view the file stored by the electronic communication server may be provided for display in the user interface of the communication application.

In further examples, the edit function may include at least a one-click edit control element, and in response to receiving an indication of a selection to preview the file, a preview pane that includes the file and the one-click edit control element may be provided for display in the user interface of the communication application. The selection of the one-click edit control element may cause the copy of the file at the cloud storage location to be opened in one of a web productivity application or a local productivity application, or a page to be provided for display, the page including selectable options to open the copy of the file at the cloud storage location in the web productivity application or the local productivity application. The edit function may include one or more additional edit control elements, and the preview pane may further include a user interface element that, when selected, causes a menu comprising the one or more additional edit control elements to be displayed.

In yet further examples, the user interface of the communication application may include a communication viewing pane that displays the electronic communication and the file, and the edit function may include one or more edit control elements provided for display as options in a menu in response to receiving an indication of a selection of a user interface element displayed in conjunction with the file in the communication viewing pane. In response to uploading the copy of the file to the cloud storage location, a notification may be provided to respective communication applications of one or more users associated with the electronic communication that indicates the copy of the file has been uploaded to the cloud storage location for editing. The productivity application may include a word processing application, a spreadsheet application, a note-taking application, a presentation application, an image editing application, or a video editing application.

Example aspects disclosed herein also include computer-implemented methods. An example method includes storing, by an electronic communication server, an electronic communication and a file attached to the electronic communication, and providing the electronic communication for display in a user interface of a communication application associated with the electronic communication server, where the user interface may include one or more functions selectable to interact with the file. The method may also include receiving, from the communication application, an indication of a selection of a function from the one or more functions, based on receiving the selection of the function, uploading a copy of the file to a cloud storage location, and storing a link to the copy of the file at the cloud storage location as a property of the file stored by the electronic communication server. The method may further include responsive to receiving, from the communication application, an indication of a subsequent selection of a function from the one or more functions, causing the copy of the file at the cloud storage location to be opened instead of uploading and opening a new copy of the file.

In some examples, the one or more functions selectable to interact with the file may include at least one of a save function and an edit function. In response to receiving the indication of the subsequent selection of the function from the one or more functions, the file stored by the electronic communication server may be referenced, the link to the copy of the file at the cloud storage location may be identified within one or more properties of the file referenced, based on the identification of the link, the copy of the file may be detected as being uploaded to the cloud storage location, and based on the detection, the copy of the file at the cloud storage location may be caused to be opened.

In further examples, subsequent to the upload of the copy of the file to the cloud storage location, an indication of a selection to reply to the electronic communication may be received from the communication application, a reply communication that includes the link may be generated, and the reply communication and a prompt to share the link via the reply communication may be provided for display in the user interface of the communication application. Subsequent to the upload of the copy of the file to the cloud storage location, an indication of a selection to preview the file may be received from the communication application, and the file stored by the electronic communication server, and a notification to indicate that the copy of the file at the cloud storage location has been updated from the file stored by the electronic communication server may be provided for display in the user interface of the communication application.

Example aspects further include computer storage media. Example computer storage media stores instructions, that when executed by a processor, causes the processor to perform operations. The operations may include storing, by an electronic communication server, an electronic communication that includes a file as an attachment, and providing the electronic communication for display in a user interface of a communication application associated with the electronic communication server, where the user interface may include one or more functions selectable to interact with the file. The operations may also include receiving, from the communication application, an indication of a selection of a function from the one or more functions, based on receiving the selection of the function, uploading a copy of the file to a cloud storage location, and storing a link to the copy of the file at the cloud storage location as a property of the file stored by the electronic communication server. The operations may further include in response to receiving, from the communication application, an indication of a subsequent selection of a function from the one or more functions, causing the copy of the file at the cloud storage location to be opened instead of uploading and opening a new copy of the file.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
    at least one processor; and
    at least one memory coupled to the at least one processor and storing instructions that, when executed by the at least one processor, cause the system to:
        access, by a communication application, an electronic communication with an attached file;
        receive a selection to interact with the attached file;
        based on receiving the selection, upload a copy of the attached file to a cloud storage location;
        store, in the attached file attached to the electronic communication, a link to the copy of the file at the cloud storage location; and
        in response to receiving a subsequent selection, from within the communication application, to interact with the attached file attached to electronic communication, cause the copy of the file at the cloud storage location to be opened.

2. The system of claim 1, wherein instructions that, when executed by the at least one processor, further cause the system to:
    in response to receiving the subsequent selection to interact with the attached file, identify, from within the attached file, the link to the copy of the file at the cloud storage location;
    based on the identification of the link, detect that the copy of the file is uploaded to the cloud storage location; and
    based on the detection, cause the copy of the file at the cloud storage location to be opened in a corresponding productivity application.

3. The system of claim 2, wherein to cause the copy of the file at the cloud storage location to be opened in the productivity application, a signal is transmitted to a server associated with the productivity application that causes the productivity application to launch and open the copy of the file at the cloud storage location, the signal including the link to the copy of the file at the cloud storage location.

4. The system of claim 1, wherein the instructions that, when executed by the at least one processor, further cause the system to cause a prompt to be provided for display in a user interface of a productivity application in which the copy of the file is open, the prompt indicating to share the link to the copy of the file at the cloud storage location using a share function of the productivity application.

5. The system of claim 1, wherein the instructions that, when executed by the at least one processor, further cause the system to:
    subsequent to uploading the copy of the file to the cloud storage location, receive an indication of a selection to reply to the electronic communication;
    generate a reply communication that includes the link; and
    cause a display of the reply communication and a prompt to share the link via the reply communication.

6. The system of claim 1, wherein causing the copy of the file at the cloud storage location to be opened in a corresponding productivity application includes causing a web version of the productivity application to be launched.

7. The system of claim 1, wherein the selection to interact with the attached file is a selection of a save function or an edit function.

8. A computer-implemented method comprising:
    accessing, by a communication application, an electronic communication with an attached file stored in a communication server;
    receiving a selection, from within the communication application, to interact with the attached file;
    based on receiving the selection, uploading a copy of the file to a cloud storage location;
    storing, in the attached file stored in the communication server, a link to the copy of the file at the cloud storage location; and
    in response to receiving a subsequent selection, from within the communication application, to interact with the attached file attached to the electronic communication, causing the copy of the file at the cloud storage location to be opened.

9. The computer-implemented method of claim 8, wherein the selection to interact with the attached file is a selection of a save function or an edit function.

10. The computer-implemented method of claim 8, further comprising:
in response to receiving the subsequent selection to interact with the attached file, identifying, from within the attached file stored at the communication server, the link to the copy of the file at the cloud storage location;
based on the identification of the link, detecting that the copy of the file is uploaded to the cloud storage location; and
based on the detection, causing the copy of the file at the cloud storage location to be opened in a corresponding productivity application.

11. The computer-implemented method of claim 8, further comprising:
subsequent uploading of the copy of the file to the cloud storage location, receiving an indication of a selection to reply to the electronic communication; and
causing a display of a reply communication and a prompt to share the link via the reply communication.

12. The computer-implemented method of claim 8, wherein causing the copy of the file at the cloud storage location to be opened causes the file to be opened by a productivity application, wherein the productivity application includes at least one of: a word processing application, a spreadsheet application, a note-taking application, a presentation application, an image editing application, and a video editing application.

13. The computer-implemented method of claim 8, wherein the electronic communication is an email.

14. The computer-implemented method of claim 8, further comprising generating a notification, by the communication application, to indicate that the copy of the file has been uploaded to the cloud storage location.

15. A computer-implemented method comprising:
causing a display, by a communication application, of an electronic communication with an attached file stored in a first storage location;
receiving a selection of the attached file;
in response to receiving the selection of the attached file, causing a display of a preview pane including a file previewer that displays the attached file;
receiving a selection of an edit function or a save function from within the preview pane;
based on receiving the selection of the edit function or the save function from within the preview pane, storing a copy of the attached file in a second storage location;
storing, in the attached file stored in the first storage location, a link to the copy of the attached file at the second storage location; and
in response to receiving a subsequent selection, from within the communication application, to edit the attached file attached to the electronic communication, causing the copy of the file at the second storage location to be opened.

16. The computer-implemented method of claim 15, wherein the preview pane further includes a communication previewer that displays the electronic communication.

17. The computer-implemented method of claim 16, wherein the communication previewer and the file previewer are displayed concurrently.

18. The computer-implemented method of claim 15, wherein the preview pane includes a user interface element for the edit function and a user interface element for the save function.

19. The computer-implemented method of claim 15, wherein causing the copy of the file at the second storage location to be opened causes the file to be opened by a productivity application, wherein the productivity application includes at least one of: a word processing application, a spreadsheet application, a note-taking application, a presentation application, an image editing application, and a video editing application.

20. The computer-implemented method of claim 15, further comprising generating a notification, by the communication application, to indicate that the copy of the file has been stored in the second storage location.

* * * * *